Feb. 7, 1967 D. R. BIEGEL ET AL 3,303,331

DATA SCANNING AND INDICATING APPARATUS

Filed Sept. 11, 1962 14 Sheets-Sheet 1

INVENTORS
DONALD R. BIEGEL
JOHN W. WILLIS
BY
Edward B. Gray
ATTORNEY

DATA SCANNING AND INDICATING APPARATUS

INVENTORS
DONALD R. BIEGEL
JOHN W. WILLIS
BY
Edward B. Gregg
ATTORNEY

INVENTORS
DONALD R. BIEGEL
JOHN W. WILLIS
BY Edward B. [signature]
ATTORNEY

DATA SCANNING AND INDICATING APPARATUS

INVENTORS
DONALD R. BIEGEL
JOHN W. WILLIS
BY Edward B. Gregg
ATTORNEY

DATA SCANNING AND INDICATING APPARATUS

Filed Sept. 11, 1962 14 Sheets-Sheet 5

INVENTORS
DONALD R. BIEGEL
JOHN W. WILLIS
BY Edward B. Fry
ATTORNEY

INVENTORS
DONALD R. BIEGEL
JOHN W. WILLIS
BY Edward B. Gregg
ATTORNEY

INVENTORS
DONALD R. BIEGEL
JOHN W. WILLIS
BY
ATTORNEY

DATA SCANNING AND INDICATING APPARATUS

INVENTORS
DONALD R. BIEGEL
JOHN W. WILLIS
BY Edward B. Gregg
ATTORNEY

INVENTORS
DONALD R. BIEGEL
JOHN W. WILLIS
BY

ATTORNEY

DATA SCANNING AND INDICATING APPARATUS

Filed Sept. 11, 1962 14 Sheets-Sheet 10

INVENTORS
DONALD R. BIEGEL
JOHN W. WILLIS
BY [signature]
ATTORNEY

DATA SCANNING AND INDICATING APPARATUS

INVENTORS
DONALD R. BIEGEL
JOHN W. WILLIS
BY [signature]
ATTORNEY

INVENTORS
DONALD R. BIEGEL
JOHN W. WILLIS
BY
ATTORNEY

INVENTORS
DONALD R. BIEGEL
JOHN W. WILLIS
BY Edward B. Gray
ATTORNEY

Feb. 7, 1967 D. R. BIEGEL ET AL 3,303,331

DATA SCANNING AND INDICATING APPARATUS

Filed Sept. 11, 1962 14 Sheets-Sheet 14

INVENTORS
DONALD R. BIEGEL
JOHN W. WILLIS
BY Edward B. Gregg
ATTORNEY

United States Patent Office 3,303,331
Patented Feb. 7, 1967

3,303,331

DATA SCANNING AND INDICATING APPARATUS

Donald R. Biegel, Granada Hills, and John W. Willis, Northridge, Calif., assignors to Tab Products Co., San Francisco, Calif., a corporation of California Filed Sept. 11, 1962, Ser. No. 222,842
15 Claims. (Cl. 235—61.11)

This invention relates to data scanning and indicating apparatus for use in conjunction with a data recording device. The invention also relates to the combination of such scanning and indicating apparatus with a data recording device.

The data scanning and indicating apparatus of the present invention is particularly useful with (but is not limited to use with) the well-known IBM key punch machine, such as that described in Gardinor and Crowell U.S. Patent No. 2,647,581 entitled, "A Record Card Punching Machine," issued on August 4, 1953. The data sensing apparatus of the present invention will be described with particular reference to and it is advantageously used with, such key punch machines; but it will be understood that it is not limited to use with such key punch machines, nor to data recording machines of the card punch type.

The IBM key punch machine is a keyboard operated device which is operated by human operator to punch rectangular slots in a punch card. Such cards are widely known as IBM punch cards. A brief discussion of such cards, and of the manner in which information is encoded into them is in order.

The punch card of the type refererred to is rectangular in shape and it is divided into 80 vertical columns. It also has twelve horizontal positions numbered (from top to bottom) as 12, 11, 0, 1, 2, 3, 4, 5, 6, 7, 8 and 9. Such cards are divided into fields each of which consists of one or more of the columns. Each field corresponds to some particular type of data, which is taken from a source document (or from another IBM punch card), and is encoded in the respective field by punching. Numbers are punched in the obvious manner. That is to say, if the first field of a card occupies five columns and the number 52816 is to be punched in field 1, then the first column (column #1) is punched at the No. 5 position, the second column at the No. 2 position, etc., until the desired number is punched in. If the extent of a field exceeds the significant digits in a given number, the column or columns to the left of the first significant digit is or are filled in with a zero or zeros or space or spaces. Such cards are also alphabetically coded by making two punches in a given column, making use of the 12, 11 and 0 positions as well as the digits positions 1 to 9. Each letter of the alphabet corresponds to some particular combination of two punches in a given column, in accordance with a well known system known as Hollerith Code.

To record data on a punch card it is necessary for an operator to read the data on a source document, e.g., a sales invoice, and to punch this data into a punch card. It is in connection with this punching operation that the apparatus of the present invention comes into play. The apparatus of the invention directs the attention of an operator, by means of illumination, to those areas of a source document from which data is to be copied, and it does so in a proper sequence. The apparatus also performs other useful functions, as will be explained hereinafter.

One embodiment of the invention is illustrated by way of example in the accompanying drawings in which.

Figure 2:
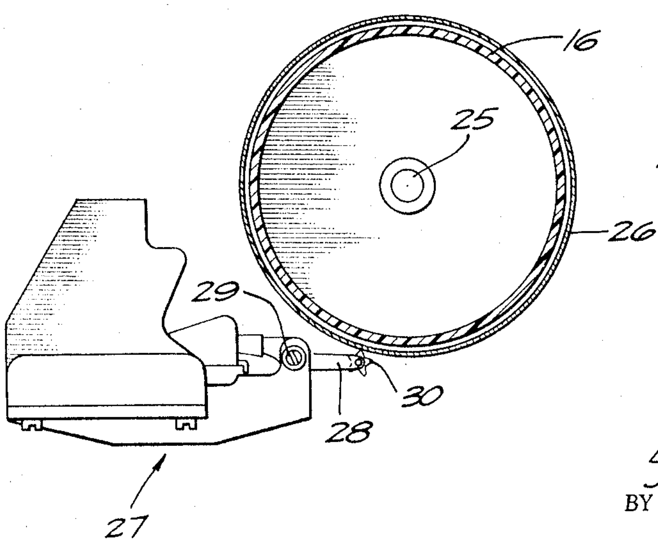
FIGURE 2 is a transverse sectional view through the program drum which forms a part of the machine of FIGURE 1, such view showing one of the star wheel assemblies which is employed, in connection with the program drum (and with a program card strapped to the drum) to program the recording of data.
Figures 3, 11:
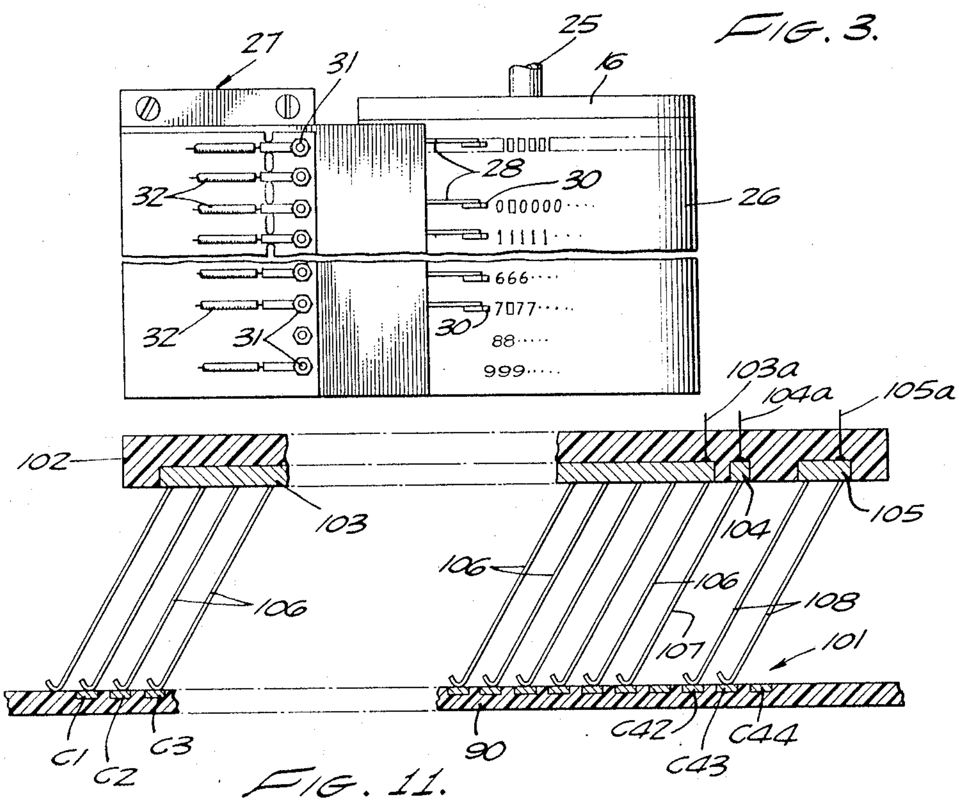

FIGURE 3 is a fragmentary top plan view of the program drum of FIGURE 2. It shows how a program card is punched to coact with star wheel assemblies to carry out the programming of the key punch machine, and it also shows how the same program card is further punched in accordance with the present invention to coact with added star wheel assemblies which actuate the apparatus of the present invention and key it into the operation of the key punch machine.

Figure 1:
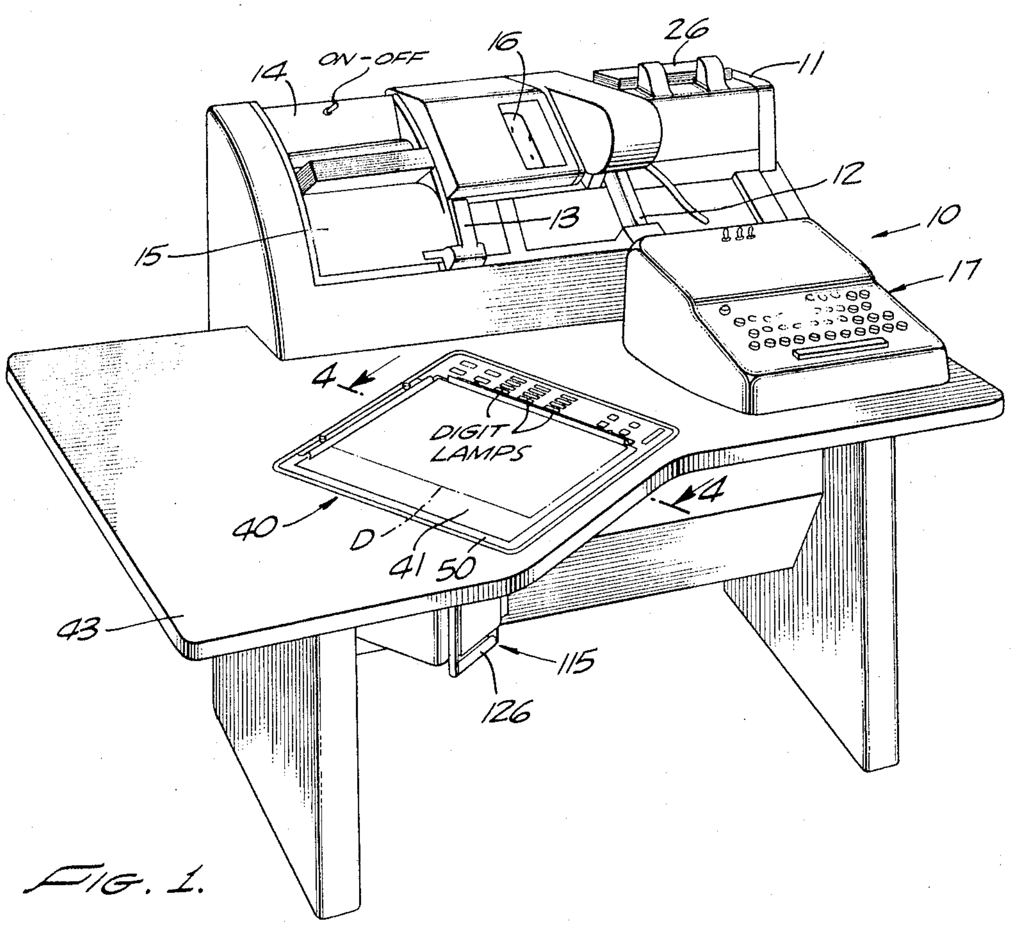
FIGURE 1 is a perspective view of a key punch machine of well known type and it shows a portion of the apparatus of the present invention installed in operative relation to the key punch machine.
Figure 4:
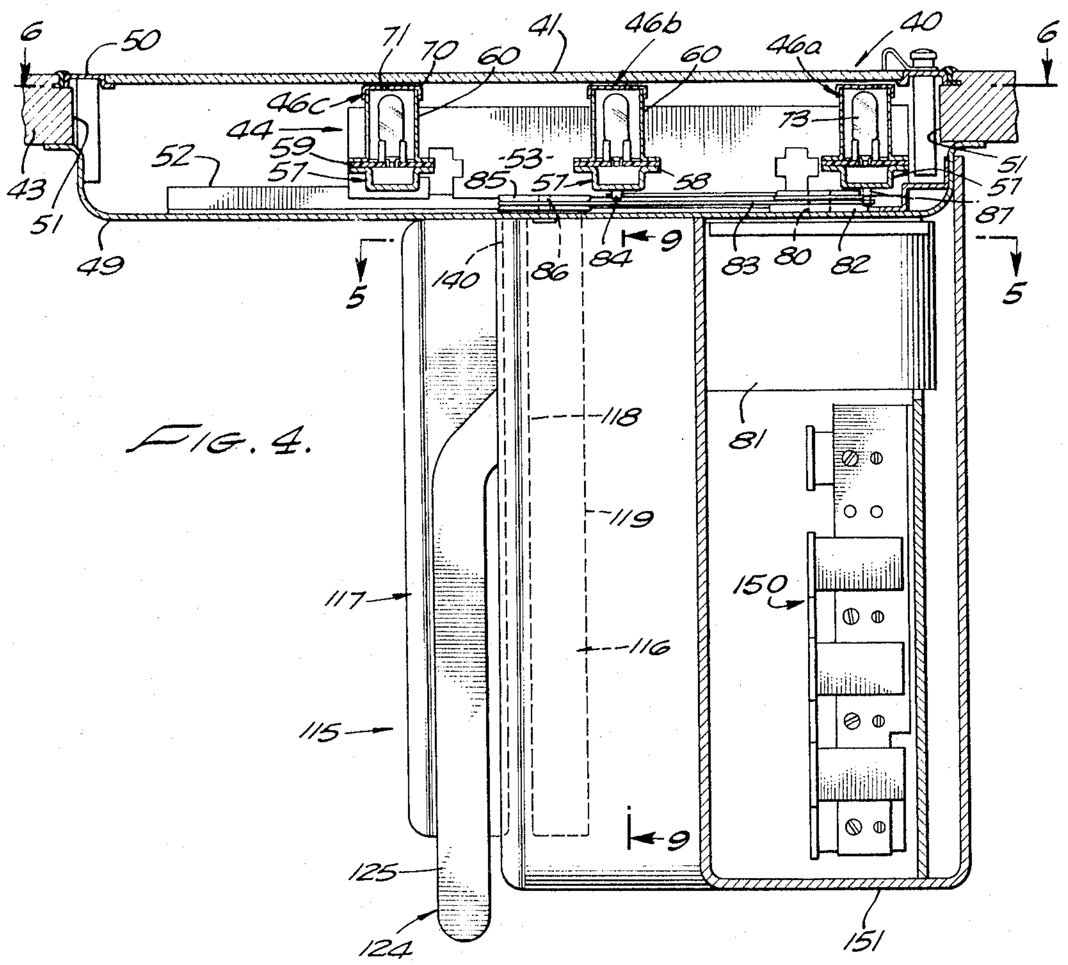

FIGURE 4 is a section taken along the line 4—4 of FIGURE 1, such being a vertical section through the reading panel, the light carriage assembly and certain other portions of the mechanical and electrical elements of the apparatus.

Figure 5:
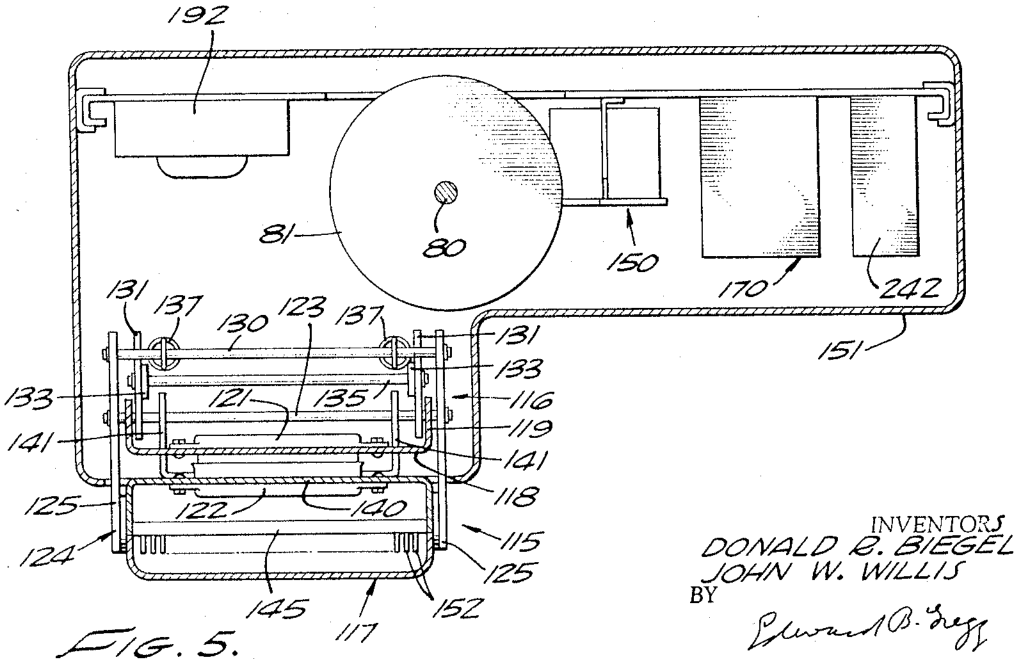

FIGURE 5 is a horizontal section taken along the line 5—5 of FIGURE 4.

Figures 6, 7:
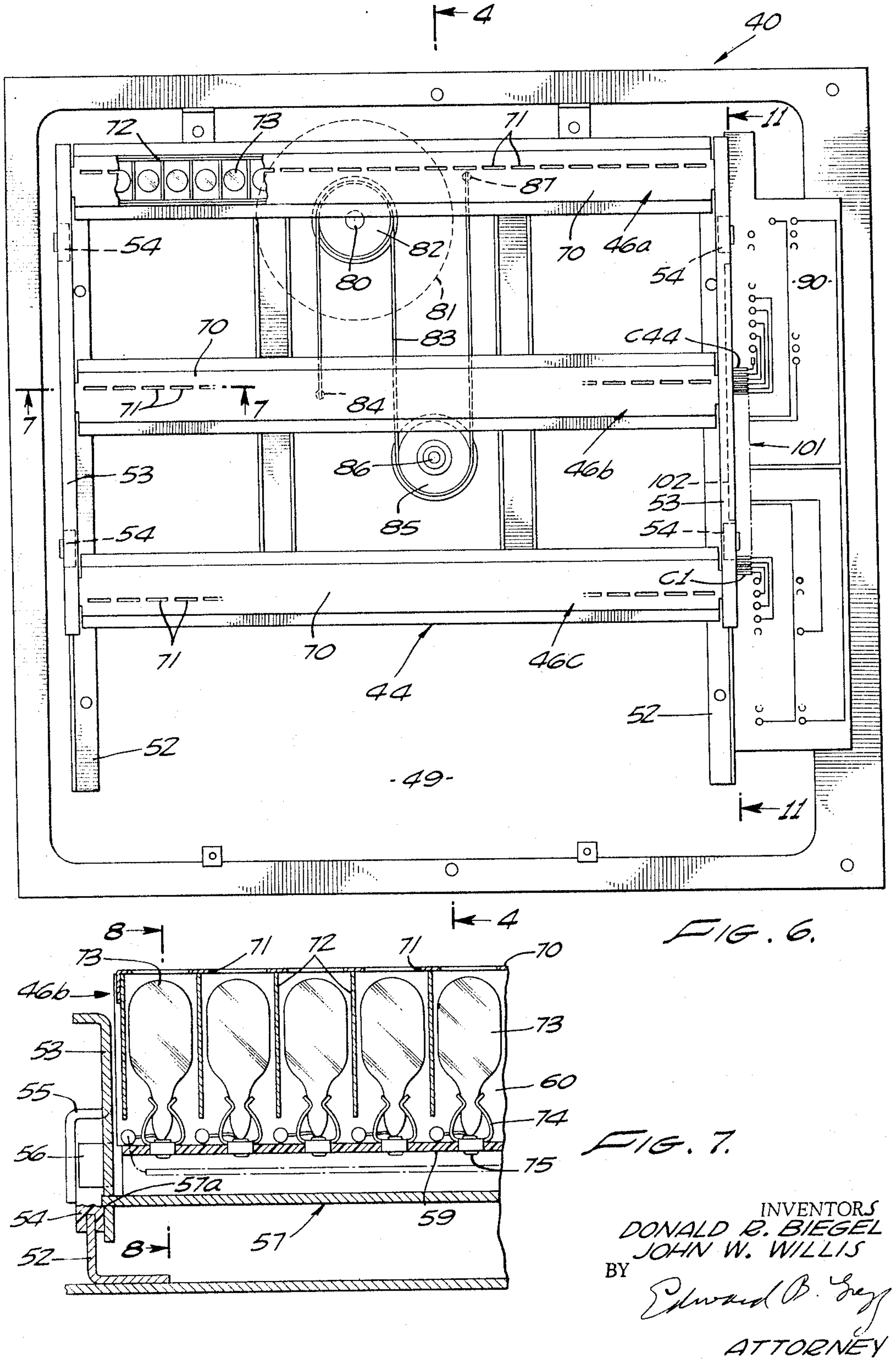

FIGURE 6 is a view taken along the line 6—6 of FIGURE 4, being, in effect, a top plan view of the carriage assembly with the reading panel removed.

FIGURE 7 is a fragmentary vertical section taken along line 7—7 of FIGURE 6 showing, on an enlarged scale, a part of one of the light bars employed to illuminate a source document sequentially.

Figure 8:
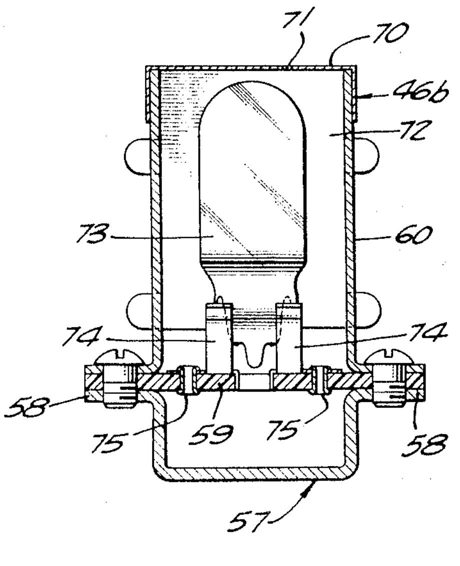

FIGURE 8 is a sectional view taken along the line 8—8 of FIGURE 7.

Figures 9, 10, 10A:
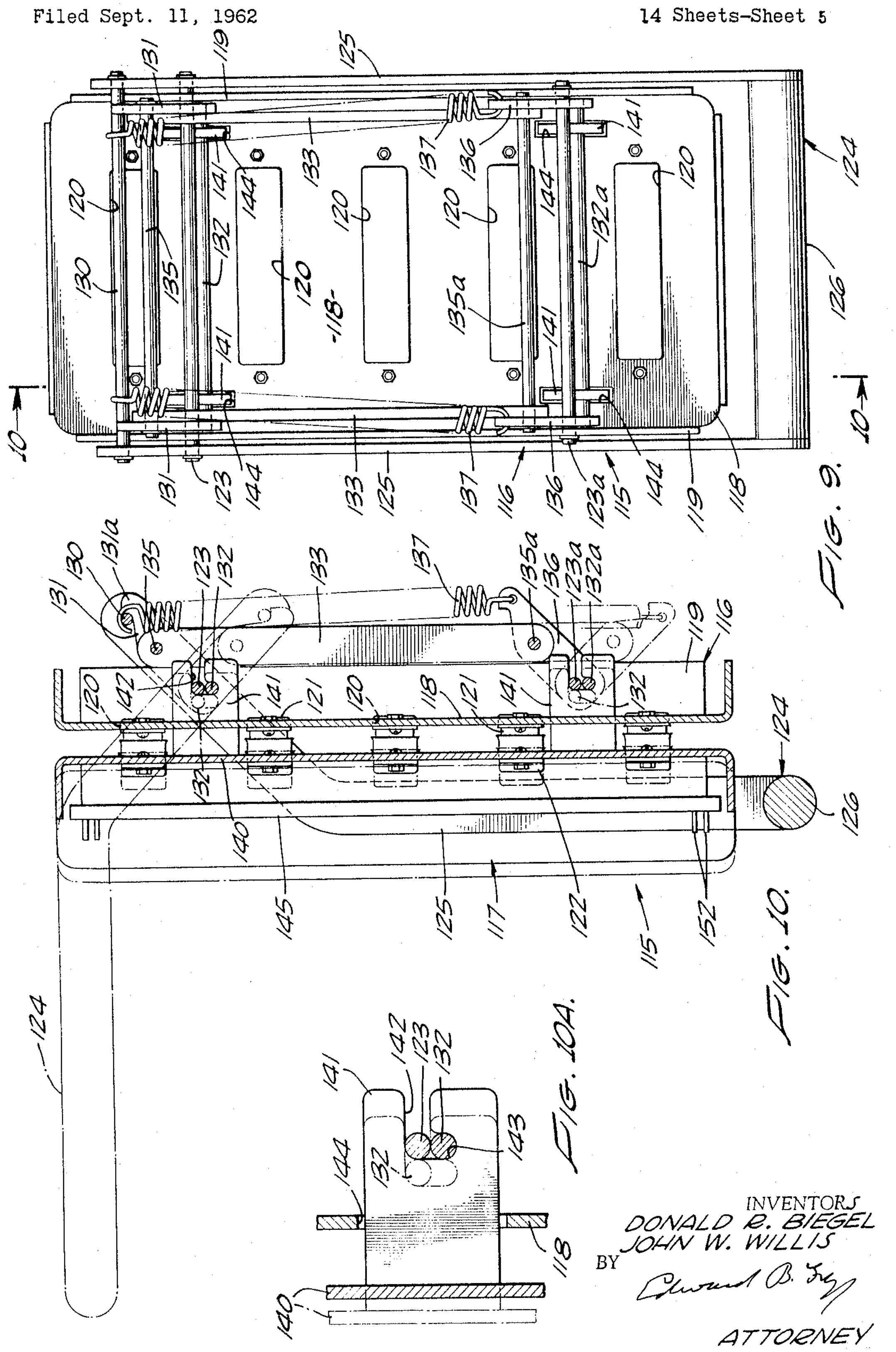

FIGURE 9 is a view in rear elevation of the program assembly.

FIGURE 10 is a vertical section taken along the line 10—10 of FIGURE 9.

FIGURE 10A is an enlarged, fragmentary view of one of the mounting and alignment brackets of the program assembly.

FIGURE 11 is an enlarged view, taken along the line 11—11 of FIGURE 6, showing the commutator assembly which is associated with the light carriage.

Figure 12:
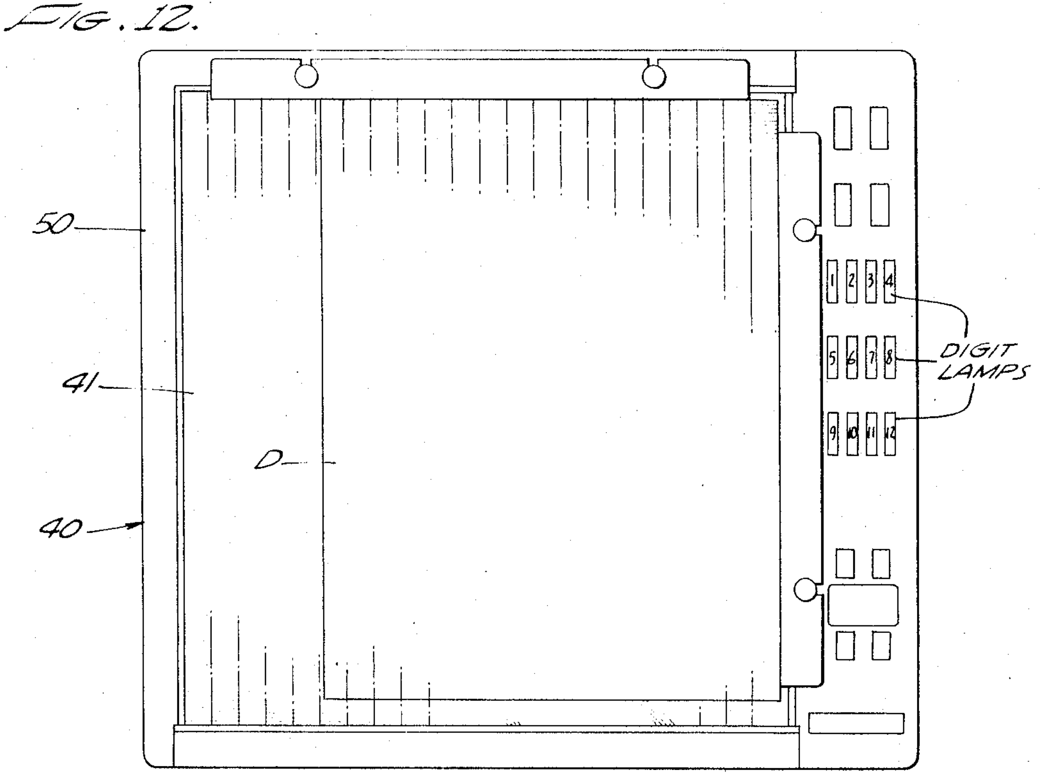

FIGURE 12 is a top plan view of the reading station of the apparatus of the invention, showing the reading panel and a source document placed thereon for scanning.

Figure 13:
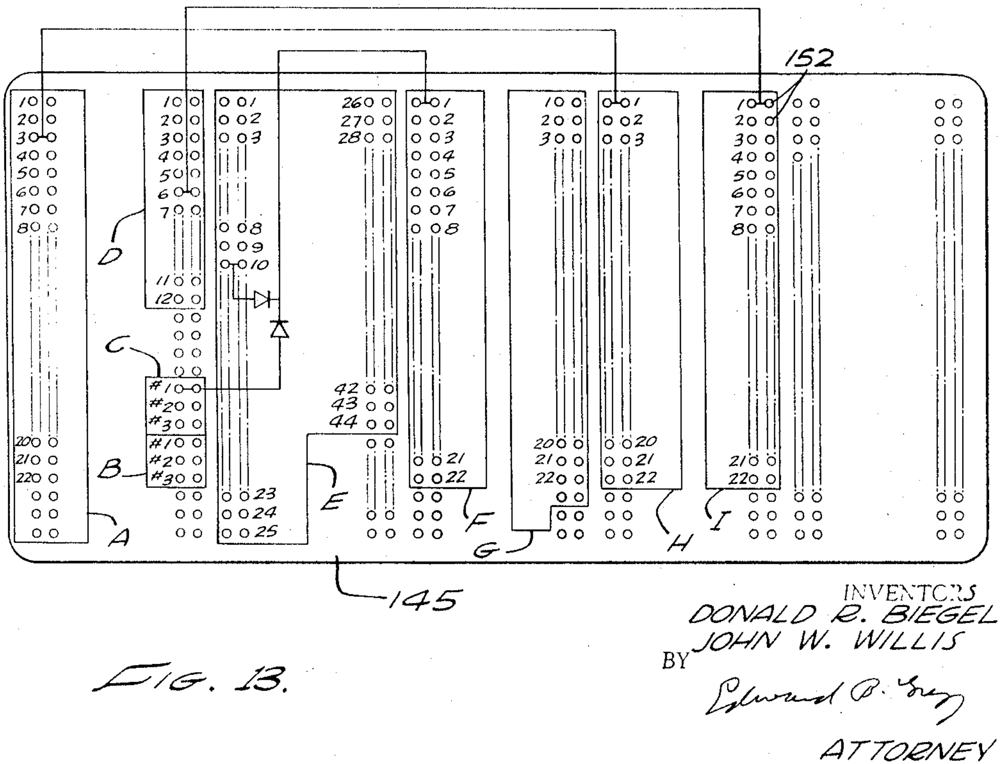

FIGURE 13 is a plan view of a removable program panel which forms a portion of the program assembly illustrated in FIGURES 5, 9 and 10. In this view the panel is shown wired for the document of FIGURE 18.

Figure 13A:
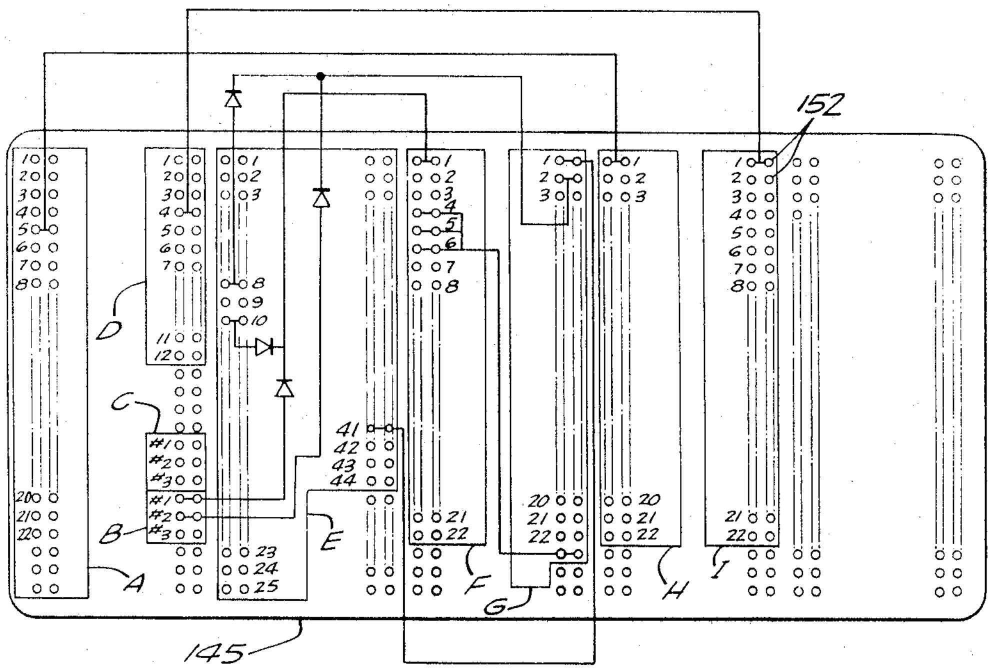
Figure 19:
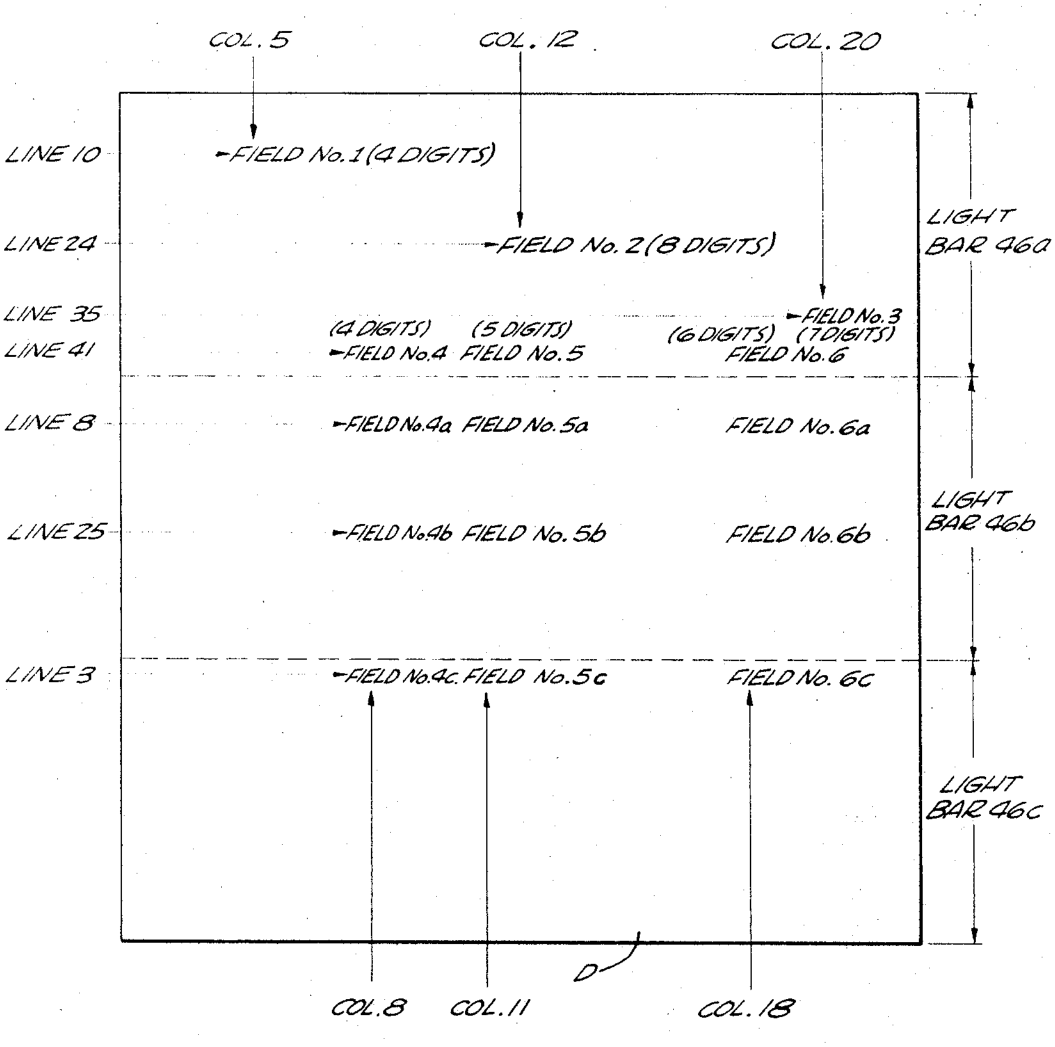

FIGURE 13A is a plan view of a similar program panel but wired for the document of FIGURE 19.

Figure 14:
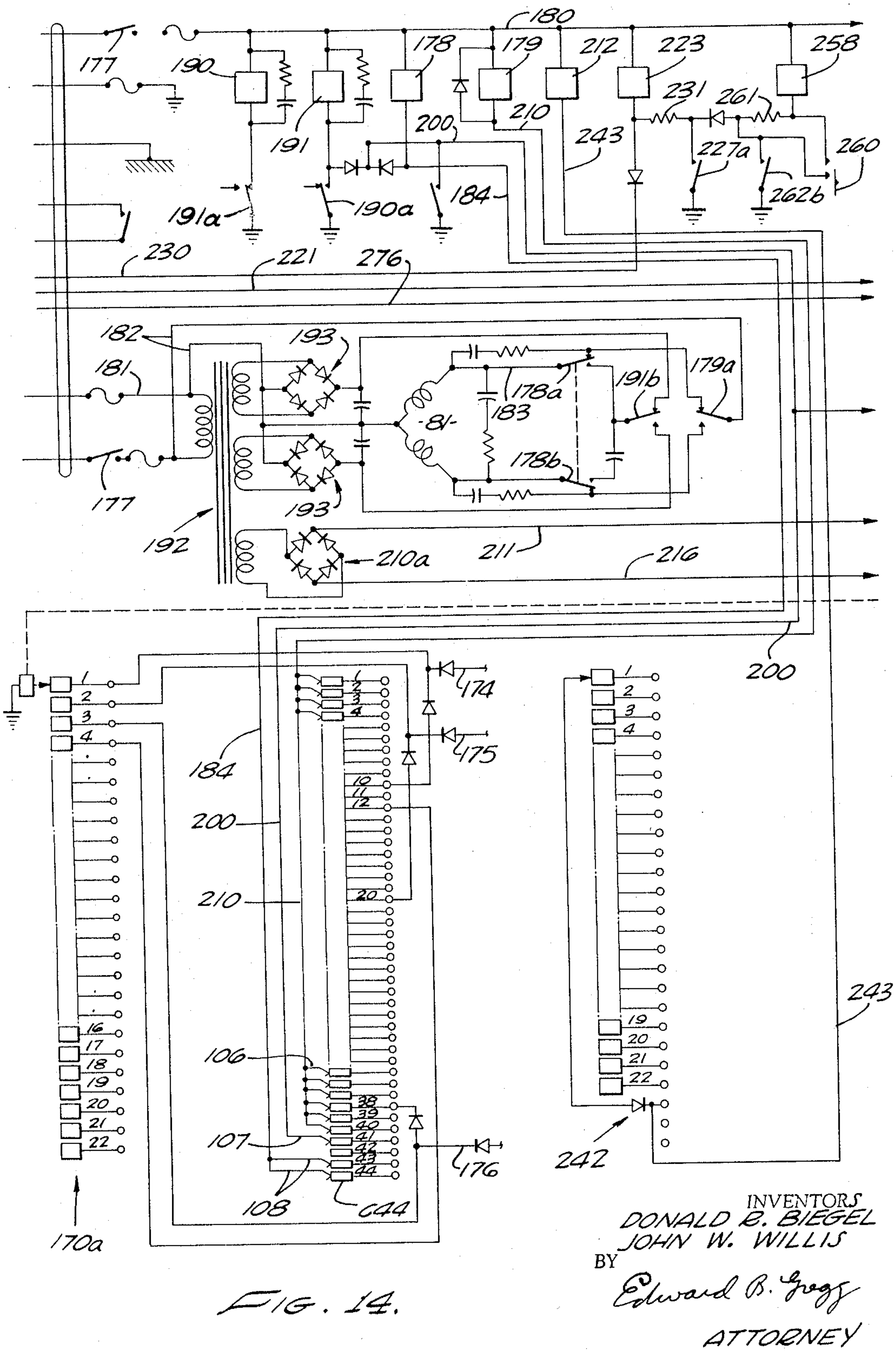
Figure 15:
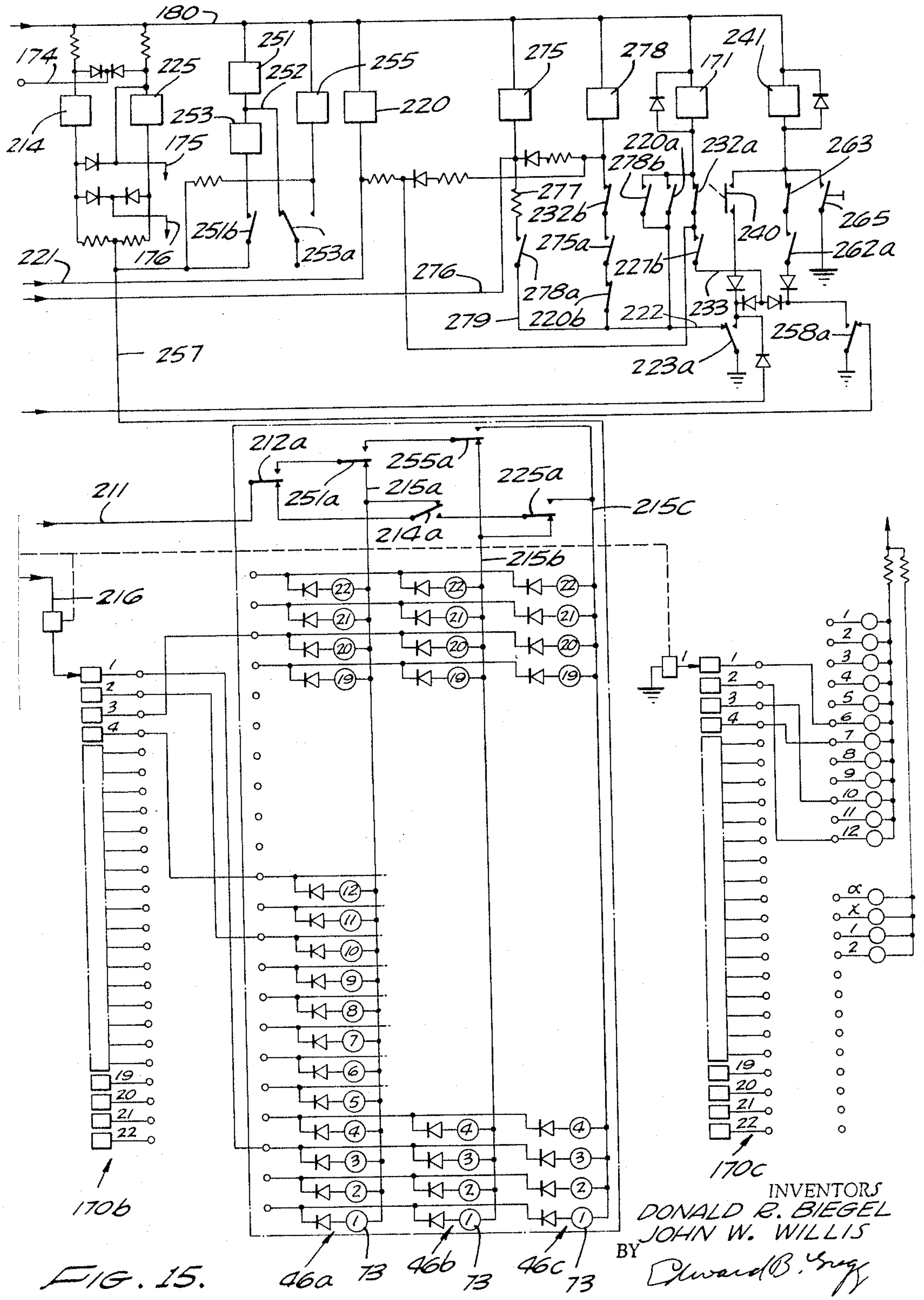

FIGURES 14 and 15 are consecutive portions of the wiring diagram, FIGURE 15 being a continuation of FIGURE 14. These figures show the wiring for the document of FIGURE 18.

Figure 16:
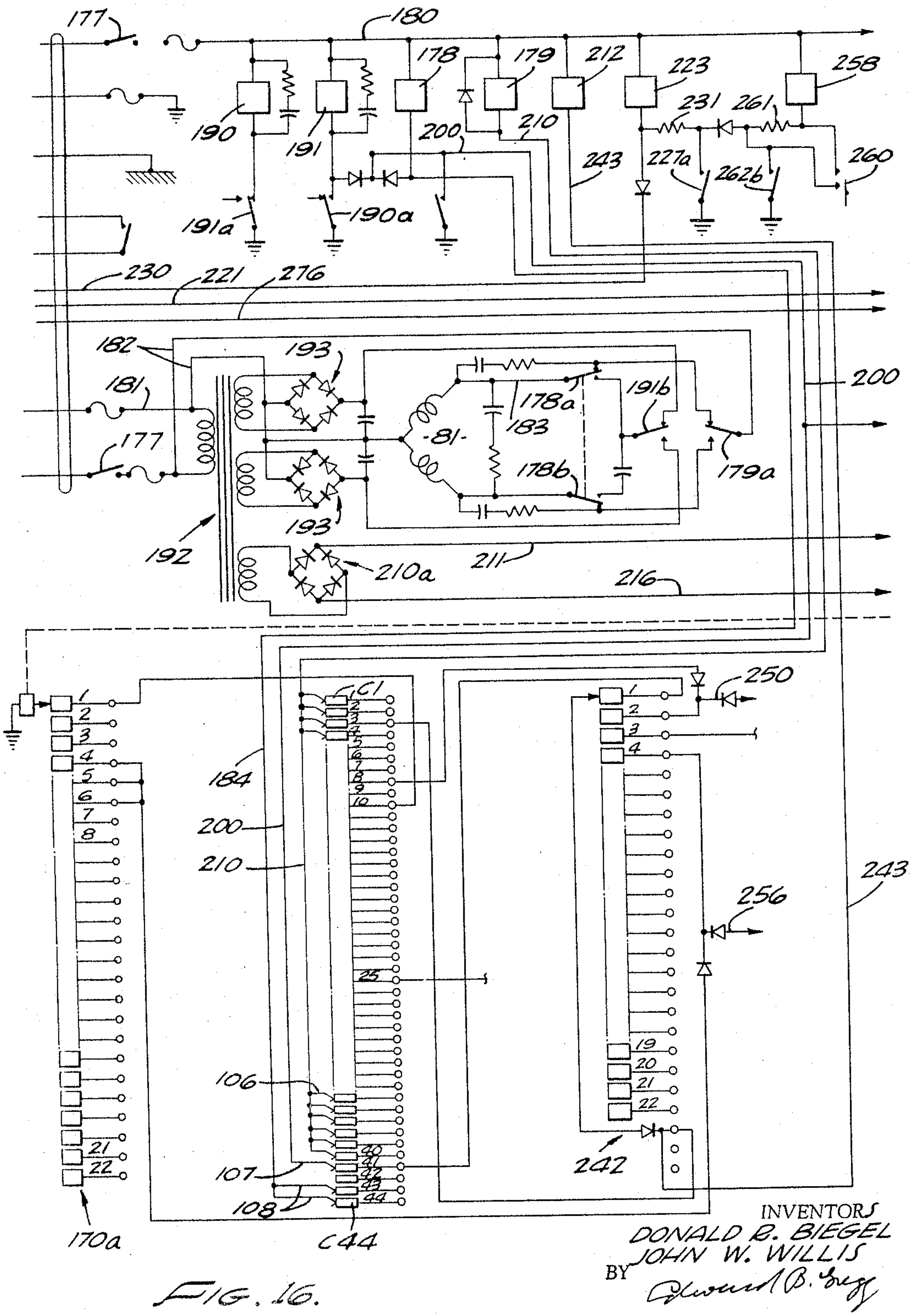
Figure 17:
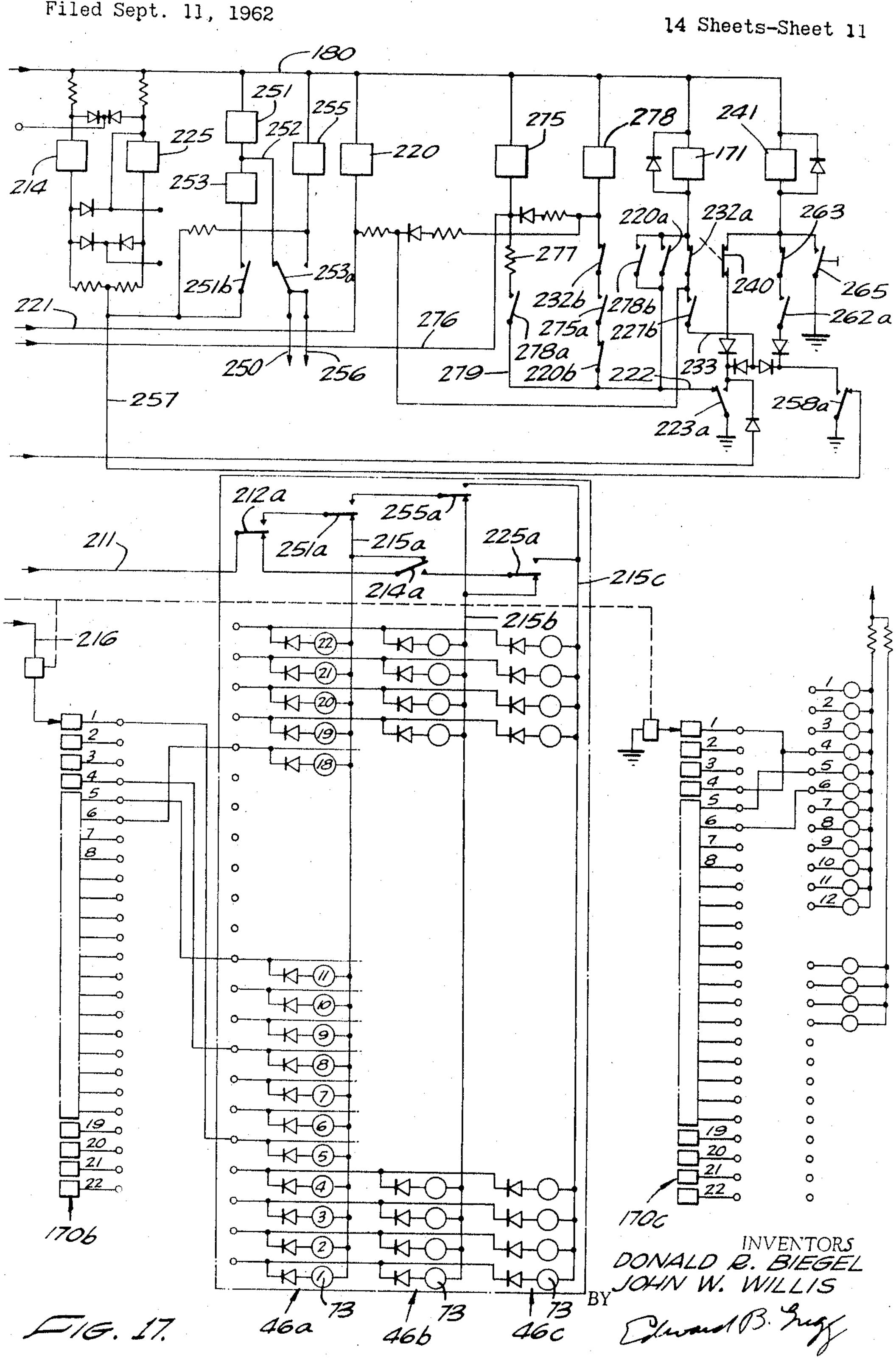

FIGURES 16 and 17 are wiring diagrams similar to FIGURES 15 and 16 but wired for the document of FIGURE 19.

Figure 18:
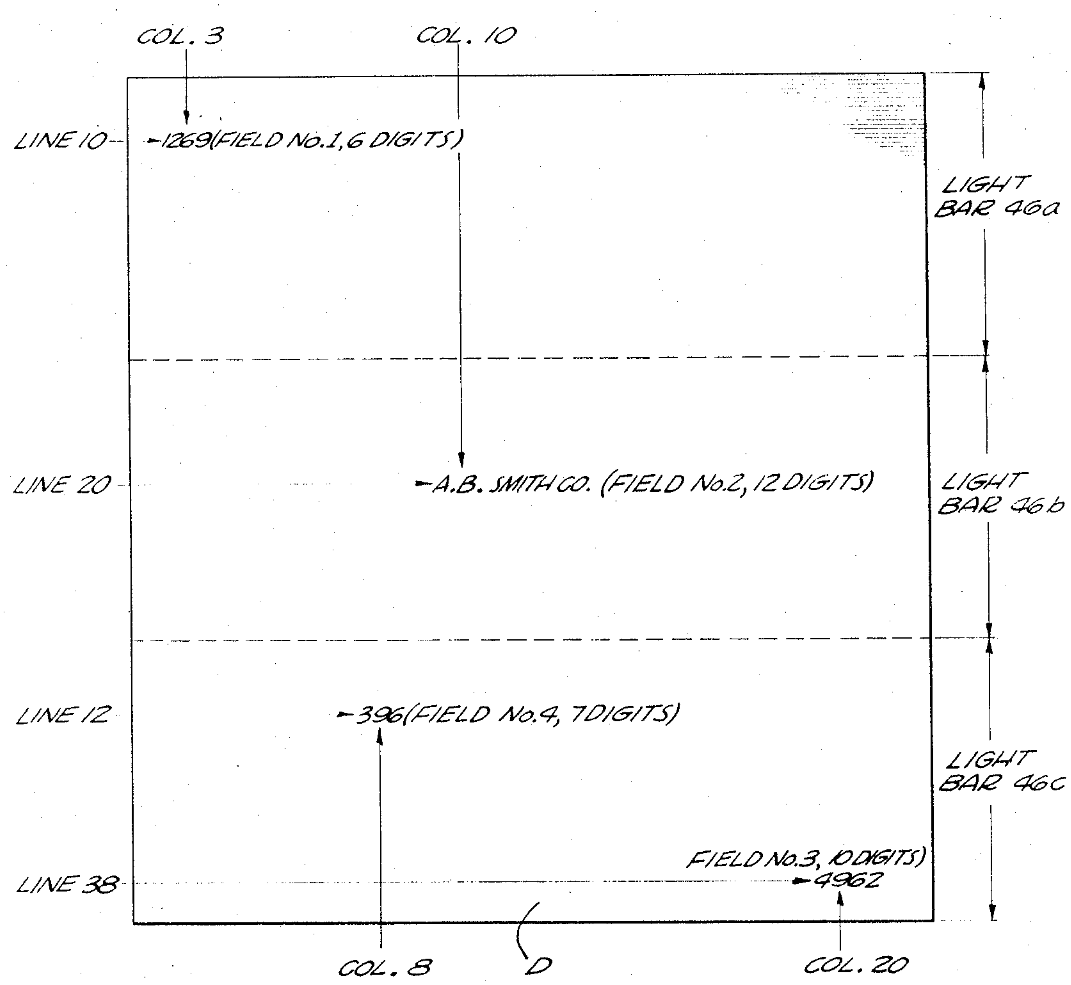

FIGURE 18 is a diagrammatic representation on a document which contains data to be punched in a punch card.

FIGURE 19 is a similar representation of a more complex document which involves a different type of card punching operation.

Figure 20:
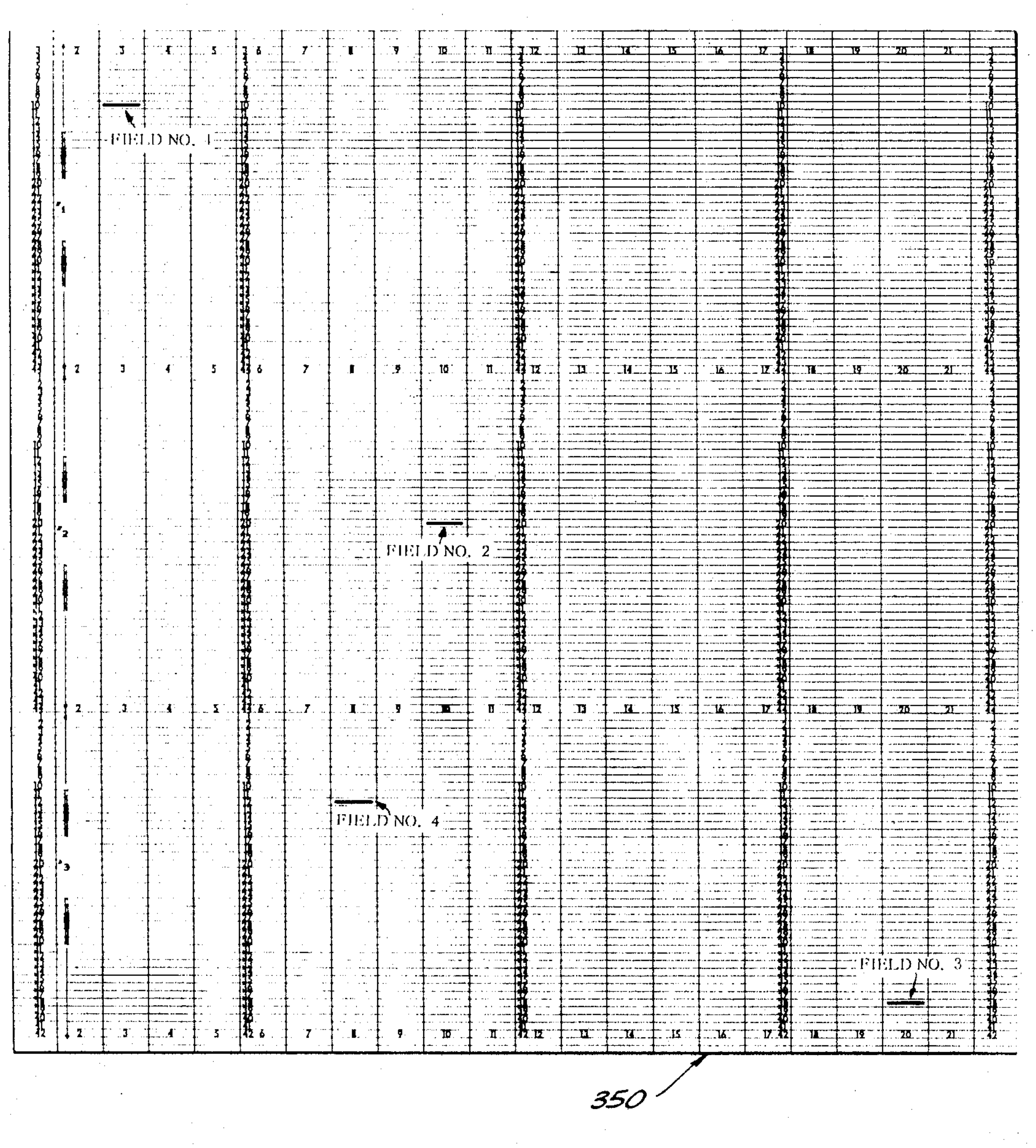

FIGURE 20 is a plan view of a reference and programming grid superimposed on a document.

Referring now to FIGURE 1 a key punch machine 10 as there shown which includes a hopper 11, a punching station 12, a reading station 13, a card receiving station 14 and a receiving hopper 15 for punched cards. A program drum is shown at 16 which is described more particularly hereinafter. Also shown in a keyboard 17. For further details concerning this key punch machine one may consult the various IBM manuals, for example, the IBM manual entitled "Reference Manual IBM Operators Guide," No. A24–1010 dated July 1959. One may also consult the aforesaid Gardinor U.S. Patent No. 2,647,581.

The program drum 16, as shown as FIGURES 2 and 3, is fixed to a shaft 25. This shaft and the drum are driven step by step in a manner which is well known in the art, under control of keyboard 17. An IBM punch card is shown at 26. The particular card shown in FIGURE 2 is a program card, but its format is like punch cards in general and like the cards 26 shown in the hopper 11 which are waiting to be punched.

Referring now to FIGURES 2 and 3 a well known star wheel sensing mechanism 27 is there shown which operates in conjunction with the program card. Each such mechanism comprises a lever or switch operating member 28 which is pivoted at 29 and carries a five pointed star wheel 30 rotatably mounted at the end of the lever 28. The lever 28 controls switch contacts (not shown) which, when closed, energize a circuit which includes a connector member or terminal 31 and a wire 32 (see FIGURE 3).

The switch contacts controlled by a star wheel 30 will remain open as long as the corresponding star wheel is in contact with a program card 26 on drum 16 at a point where the card is not punched or perforated. But when a point of the star wheel registers with a punch or perforation in the program card it drops into the punch or perforation and thereby closes the switch contacts. If two or more slots are punched in successive columns of a horizontal row, e.g., in the third and fourth columns of No. 12 row, the corresponding star wheel will continue to engage a perforation and its switch contacts will remain closed. But if one or more columns are not punched, the corresponding star wheel will move out of the preceding perforation and its switch contacts will be opened and will remain open until the next perforation is encountered.

As is well known in the art, the closing and opening of the contacts of the star wheels 30 energizes and deenergizes circuits of the key punch machine 10 to control the punching of the card at the punching station 12, e.g., to skip a field, to indicate the commencement of a new field, etc.

It will also be observed in FIGURE 3 that two star wheels are added, in the No. 6 and No. 7 positions. It is the operation of these star wheels (the No. 6 and/or No. 7 star wheels) which, in large part, controls the data scanning apparatus hereinafter described.

A key punch operator must use intelligence and must aquire considerable skill and experience to spot items of data on a source document in the proper order, and to know in each instance how many columns or digits are in the respective field so that the necessary zeros may be punched in to the left of the first significant digit. For example, invoice numbers in field No. 1 may run from 1 to 100,000 in which case a field of at least six digits would be required. One document in a group may have invoice number 219 and will require the punching of three zeros in the first three columns of the field; the next document may have invoice number 49682 and will require one zero, etc. Also data may be (and frequently is) distributed randomly with respect to the sequence of fields, hence, will require the operator to shift her attention in a sequence which is contrary to the normal reading sequence.

It will be apparent that a considerable degree of intelligence, skill and attention are required; that the possibilities of errors are great; that considerable training time is required; and that when a skilled, trained operator shifts from one type of document to another, for example, from sales invoices to bills of lading, she must learn a different programming, or must revert to programming which she learned previously but has not used for awhile.

The data scanning and indicating apparatus of the present invention serves to guide the operator by means of lights, to direct her attention to successive fields in the proper order and also to indicate the number of columns or digits in each field. The aforesaid apparatus also performs other very useful functions, as will be apparent from the ensuing description.

Referring now to FIGURES 1 and 12, a document D is there shown in position for reading by the operator of the key punch machine 10 and for proper operation of the apparatus of the present invention, which is generally indicated by the reference numeral 40. The apparatus 40 has a translucent panel 41 which may, for example, be of glass or translucent plastic construction, which holds document D in proper position and which permits light to shine through the document.

The apparatus 40 is carried by a table 43 (see FIGURE 1) which is cut away appropriately to receive the apparatus. The mechanical parts of the apparatus will now be described in reference to FIGURES 4 to 10.

Referring now to FIGURES 4 and 6, a sliding framework or carriage 44 is provided which comprises three light bars **46*a*, 46*b* and 46*c* which are intended to scan the top third (as viewed in FIGURES 1 and 11) of document D, the middle third and the bottom third thereof, respectively. A pan 49 (see FIGURE 4) is affixed to the under surface of the table 43 and a rim 50 is affixed to the upper surface surrounding an opening 51 formed in the table 43. A pair of parallel angles 52 (see also FIGURE 7) are affixed to the pan 49 on opposite sides thereof. The vertical portions of these angles serve as tracks for the carriage 44. Running on each of these tracks is a carriage side member 53 to the lower edge of which, near each end, is affixed a slide member 54 of nylon or other suitable low friction, self-lubricating noiseless bearing material which is notched, as shown to slideably fit over the respective track. Each carriage side member 53 is notched, cut away and bent suitably to form retaining ears 55 and 56 which bear against the outer side and the edges, respectively, of each slide member 54** to hold the latter in place.

The light bars **46*a*, 46*b* and 46*c* are formed identically, hence a detailed description of one of them (46*b*) will suffice. Referring to FIGURES 7 and 8, a channel 57 is provided whose bottom portion has an extension 57*a* at each end which is anchored to respective carriage side member 53. Top flanges 58 of channel 57 are secured by means of screws to a layer of insulating material 59 and to supervening opaque wall members 60. The wall members 60 are covered by an opaque cover 70 which is slit at intervals at 71 (see also FIGURE 6). Opaque dividers 72 are provided which divide each light bar into separate compartments, one for each slit 71. Each compartment has therein a lamp 73 which is held by a conductive clip 74 on each side, and each clip is electrically connected to a terminal 75** to which wires are connected.

Referring to FIGURE 6 the motive means for the carriage 44 is provided as follows: A motor shaft 80 is rotated by a motor 81 (see also FIGURES 4 and 5). A pulley 82 is fixed to motor shaft 80. A cable 83 is affixed at one end at 98 to the middle light bar **46*b* and is wrapped twice about the pulley 82; it then passes about a guide pulley 85 free on a shaft 86 which is mounted on pan 49; and at its other end the cable is fixed to the light bar 46***a* at 87.

The carriage 44 is shown in FIGURE 6 at its highest or uppermost position. During movement from such position to its lowermost position, the upper light bar 46*a* will scan the upper third of document D, the middle bar 46*b* will scan the middle third thereof, and the bottom bar 46*c* will scan the bottom third of the document. (Actually, the "thirds" referred to are thirds of a document of a specific length, but for purposes of explanation herein it may be assumed that the "thirds" relate to any given document. As will be apparent from subsequent description, the "thirds" are thirds of a reference grid shown in FIGURE 22.)

This arrangement of the bars limits the degree of travel required for a complete scanning operation, and the bars 46*a*, 46*b* and 46*c* are selectively activated in the manner described hereinafter so that, when the data to be indicated lies in the portion of a document corresponding to any one of the light bars, the data to be indicated, and that light bar (and only that light bar) will be activated.

Referring now to FIGURES 6 and 11 a brush and commutator assembly is there illustrated. A board 90 of suitable insulating material is supported beneath the carriage 44 and to the right thereof as viewed in FIGURE 6. This board is also shown in FIGURE 11. A commutator 101 is formed thereon, for example, by means of printed circuit technique. There are 44 individual commutator contacts which will be indicated as C–1, C–2, etc., on to C–44. These forty-four contacts correspond to forty-four horizontal lines in the upper third of the document D, or to forty-four such lines on the middle third of document D, or to forty-four such lines on the bottom third of document D. Such lines will be described more fully hereinafter. Mounted on and carried by carriage 44 above the commutator board 90 and its contacts C–1, etc., is a board 102 of insulating material in which are embedded three conductors 103, 104 and 105 to each of which is connected a wire 103*a*, 104*a* or 105*a*, respectively. To conductor 103 (which is of relatively great length) are attached forty-four spring like members 106, each of which can contact a single commutator contact C–1, C–2, etc., and which are spaced apart a distance equal to the spacing of the contacts C–1, C–2, etc. To conductor 104 is attached a single similar spring like brush 107 which is spaced from the adjacent brushes 106 by the distance between two adjacent contacts C–1, C–2, etc. To the conductor 105 are fixed two spring like brushes 108, the first of which is spaced from brush 107 by twice the distance between adjacent contacts C–1, C–2, etc. For reasons which will become apparent, brush 106 (signifying elements 106 collectively) will be referred to as the "reverse brush"; brush 107 as the "prime brush" and brush 108 as the "A.C.–D.C. brush."

As explained hereinafter, in order that the apparatus 40 may scan a document in a predetermined sequence, the wiring of the various elements of the electrical circuit must be carried out in a predetermined manner; that is, the apparatus must be electrically programmed. But if the circuit is so wired or programmed for a particular type of document, it must be re-wired to program it for a different document. If the re-wiring is carried out in the ordinary manner by disconnecting those wires which are no longer needed (and which must be disconnected for reprogramming) and by connecting other wires as needed, the reprogramming is tedious and time consuming. To obviate this difficulty a flexible, quick change type of program assembly is provided which comprises a fixed element (i.e., fixed in the sense that it is installed in the apparatus and remains as a permanent part thereof) and a removable programming element which is wired separately (e.g., by the customer). A stock of such removable programming elements are pre-wired, each for a particular type of document or operation. The program assembly also includes a mechanism for bringing the fixed and movable elements together accurately to form connections between them.

The program assembly is shown installed in FIGURES 4 and 5 and it is shown detached from the apparatus in FIGURES 9 and 10. It is generally designated by the reference numeral 115. The fixed element thereof (see FIGURES 9 and 10) is indicated by the reference numeral 116 and the removable programming element is indicated by the reference numeral 117.

The fixed element 116 comprises a metal plate 118 having side flanges 119 and it is affixed to and depends from the pan 49 (see FIGURE 4). Plate 118 is formed with five rectangular openings 120 (see FIGURE 9) which are intended to receive multiple female connector plugs of jacks 121 (see FIGURES 5 and 10) which are intended to mate with corresponding multiple male plugs of jacks 122 (which are also shown in FIGURES 5 and 10). A pivot rod 123 is carried by the flanges 119 near the upper ends thereof and on this rod is pivoted a bail-like handle 124 having arms 125 and a cross member or hand grip 126. The handle 124 is intended to swing between the up or release position shown in broken lines and the down or locking position shown in solid lines in FIGURE 10. The up position permits release of removable element 117 and insertion of a new element, while the down position locks the elements 116 and 117 in operative relation. A rod 130 is connected to the ends of and extends between arms 125. A pair of cam links 131 are provided each having a hooked upper end 131*a* which engages rod 130. A rod 132 extends between and is carried by the ends of cam links 131 and is affixed thereto but such rod does not extend to flanges 119. Tie bars 133 are provided which are pivotally connected at their upper ends to a rod 135, cam links 131 are pivotally connected to rod 135. The lower ends of tie bars 133 are pivotally connected to a rod 135*a*, as are cam links 136. Rods 123*a* and 132*a* associated with links 136 have the same functions as the rods 123 and 132, respectively. As will be seen, a pair of springs 137 are provided, each of which is attached at its upper end to rod 130 and at its lower end to one of the cam links 136.

The removable element 117 comprises a plate 140 which is formed with openings which are identical with and which are intended to register with the openings 120 of plate 118. Plate 140 is also provided with four forwardly projecting brackets 141, there being a pair of such brackets near the top of the plate and a pair near the bottom thereof. Each of the brackets is formed with a bayonet slot. As is more clearly shown in FIGURE 10A, this bayonet slot has a horizontal entry portion 142 and a vertical locking portion 143. The plate 118 of fixed element 116 is formed with slots 144 (see FIGURE 9) to receive the brackets 141. The plate 140 is fitted with a program panel 145 which will be described in detail hereinafter.

Referring to FIGURE 10, the removable program element 117 is inserted as follows: The handle 124 is raised to the up position shown in broken lines in FIGURE 10. Element 117 is maneuverd until its brackets 141 register with the slots 144 of plate 118 and these brackets are pushed through the slots as far as can be. It will be seen that, with handle 124 in the up position indicated, rods 123 and 132 at the top and rods 123*a* and 132*a* at the bottom will be in alignment. That is to say, rods 132 and 132*a* will be in the positions shown in broken lines in FIGURE 9 and also in FIGURE 10A. This permits assembly 117 to be pushed in until rods 132 and 132*a* abut the inner ends of the bayonet slots. Then the handle 124 is moved to the down position shown in solid lines. Inasmuch as each of the cam links 131 pivots about a fixed axis (the axis of its rod 123 or 123*a*), the adjacent rods 132 and 132*a* must also rotate about this axis into the position shown in solid lines in FIGURES 10 and 10A. This exerts a pulling force on the element 117 and pulls it toward the element 116. This pulling force is exerted in a straight line, perpendicular to the plates 118 and 140. This brings the male and female contacts (that is, the pins and sockets) of the connectors 121 and 122 into contact with one another and properly engages these connectors with one another.

If element 117 is inserted incorrectly, the action just described will not result and the drawing together of the elements 116 and 117 in the manner described will be blocked. The only effect of lowering the handle 124 will be to stretch the springs 136. When the handle is released these springs will rotate the handle 124 back to or toward its up or release position, and the person responsible will realize that he has improperly inserted brackets 141. He will, therefore, readjust the element 117 until a proper registry of the brackets has been achieved.

The connectors 121 and 122 are of well known type, e.g., those of the Amphenol Company, Model No. 57–10500. They have mating pins and sockets, and for each pin and each socket there is a terminal to which a wire can be soldered. In the apparatus of the present invention, as explained more fully hereinafter, the terminals of female connectors 121 are permanently wired to the circuitry shown at 150 in FIGURE 4 (such being enclosed in a housing 151 which is supported by pan 49). Cross connections (i.e., program connections) are made by cross wiring between pins 152 of panel 145 (such pins being shown in FIGURE 10) and wiring such pins to male connectors 122.

By this means multiple connections between the permanent or fixed element 116 and the removable element 117 can be achieved very quickly and without any degree of skill. That is to say, the apparatus 40 can be reprogrammed very quickly and without any skill except for the program wiring of element 117.

Referring now to FIGURES 14 and 15 (and from time to time to certain of the mechanical views) a stepping switch is employed which is referred to generally as 170 and which constitutes a major programming element of the apparatus. This switch is a well known type of switch. A suitable type is that manufactured by C. P. Clare Co. of Chicago, Illinois, Model No. 211. The switch 170 is shown in FIGURE 5 in its entirety. It has three rotors (not shown) which are driven in unison by pulses from a coil 171 which appears in the upper right hand quadrant of FIGURE 15. Each of the three rotors of switch 170 has 22 contacts which are shown at 170*a* in FIGURE 14 and at 170*b* and 170*c* in FIGURE 15. When the coil 171 is energized a spring operated stepping mechanism is cocked, ready for action. When the coil 171 is de-energized, this spring-operated mechanism acts to step the rotors one increment, e.g., from contact No. 1 to contact No. 2. Such operation is well known in the art and requires no further detailed description herein except for the circuitry involved which employs the stepping switch 170 as described hereinafter.

The contacts 170*a* are shown associated in FIGURE 14 with commutator contacts C–1 through C–44 (which are also shown in FIGURES 6 and 11). Switch contacts 170*b* are shown associated in FIGURE 15 with lamps 73 of light bars 46*a*, 46*b* and 46*c* (which are also shown in FIGURES 4, 7 and 8). These lamps will be referred to hereinafter as the "field lamps" and as "field lamp No. 1" (the first such lamp in a bar), "field lamp No. 2" (the second lamp in a bar), etc. Switch contacts 170*c* are shown associated in FIGURE 15 with digit lamps which are also shown in FIGURES 1 and 12. These digit lamps will be referred to hereinafter as "digit lamp No. 1" (the first lamp in the first row in FIGURE 12), "digit lamp No. 2" (the second lamp), etc.

Referring now to FIGURE 18, a document D is there shown with four items of data thereon to be read by an operator in the sequence indicated and encoded, respectively, in fields Nos. 1, 2, 3 and 4 of a punch card. The example given is very simple but it will suffice to indicate certain programming features of the apparatus of the present invention.

It will be seen that the first item of information or data is located in the upper left-hand corner of the document; that it is in the upper third of the document; that it is a four-digit number; and that it is to be entered in a field (field No. 1) which has six digits, that is, which occupies 6 columns of a punch card.

It will be understood that the parenthetical and marginal legends and explanatory material in FIGURE 18 is placed there for purposes of present explanation and does not appear on an actual document, it being one of the functions of the apparatus of the present invention to guide and assist the operator of a key punch machine in selecting and encoding data in the proper sequence and correctly in other respects. It will also be seen that this first item is located, with reference to a grid having twenty-two vertical columns (see FIGURE 20) in column No. 3; that it is located with respect to such grid in the upper third of the document (such thirds being indicated by broken lines); and that it is located in line No. 10 of the upper third of the grid of FIGURE 20. The second item is located in the middle third of the document at column 10 and line 20. The third item of data appears in the bottom third of the document located at column 20 and at line 38. The fourth item of data is also located in the bottom third of the document, but it is located at column 3, line 12.

It will be noted that each item of data belongs in a predetermined field; that all the items except No. 2 are numeric; that item No. 2 is alphabetic; and that each field has a predetermined number of columns or digits.

In scanning this document it is necessary for the operator to enter the digit "1269" in field No. 1 and to enter two zeros to the left of the first significant digit to fill out this field inasmuch as it is a six digit field. It is then necessary for the operator to shift attention to the middle third of the document and to enter the name "A. B. Smith Co." in field No. 2, using for this purpose an alphabetic punch or control which is embodied in the key punch machine. The operator must then proceed to the bottom third of the document and punch the number "4962" in field No. 3. Inasmuch as this is a ten digit field, she must punch in six zeros to the left of the first significant digit. Finally, she must move back up and punch the number "396" into field No. 4, which is a seven digit field.

Referring again to FIGURES 14 and 15 contacts Nos. 1, 2 and 3 of stepping switch 170*a* are wired respectively to commutator contacts Nos. 10, 20 and 38, which means that the apparatus is programmed to indicate data, first in line 10, then in line 20, and then in line 38. Contacts Nos. 1, 2 and 3 of switch 170*b* are wired to field lamps Nos. 3, 10 and 20, which means that the apparatus is programmed first to illuminate a field lamp No. 3, then a field lamp No. 10 and then a field lamp No. 20. Contacts Nos. 1, 2 and 3 of switch 170*c* are wired, respectively, to digit lamps Nos. 6, 12 and 10, which means that the digit lamp No. 6 is the first to be illuminated, then digit lamp No. 12, and then digit lamp No. 10.

The above programming very briefly described, which will be elaborated hereinafter, leaves out of account the fact that the apparatus must also select or activate the proper light bar 46*a*, 46*b* or 46*c*. Specifically the programming must first activate light bar 46*a* for field No. 1 inasmuch as the data in this field is located in the upper third of the document, which is scanned by bar 46*a*; it must then activate bar 46*b* to spot field No. 2; and it must then activate bar 46*c*. This programming is accomplished as follows: The light bar 46*a* is activated by a program wire 174. This program wire is shown in the center of FIGURE 14 connected to the wire which connects contact No. 1 of stepping switch 170*a* to commutator contact No. 10. It is also shown in the upper left of FIGURE 15 connected to a diode junction. (By "activated" it is meant that the switching network is placed in a state such that any of the lamps of the respective bar can be illuminated.) Activation of bar **46*b* is accomplished by wiring certain elements of the circuit described hereinafter by means of a program wire 175, a fragment of which is shown in the middle portion of FIGURE 14 and a fragment in the upper left-hand portion of FIGURE 15. The activation of bar 46*c* is accomplished by wiring certain elements of the circuit described hereinafter with a program wire 176**, a fragment of which is shown in the lower central portion of FIGURE 14 and a fragment in the upper left-hand portion of FIGURE 15.

It is assumed that the master switch of the key punch machine 10 (see FIGURE 1) has been turned on; that the hopper 11 is supplied with punch cards 26; and that an appropriately punched program card has been placed on the program drum. The operator will, in accordance with custom, depress the release button of the key punch machine to release a card to the punching station and will depress the feed button of the key punch machine to activtae the feeding cycle. These operations are well known and require no further description herein. At this time the operator will close gang switch 177, which is shown in the upper left-hand portion of FIGURE 14. This switch turns the circuit on for the apparatus of the present invention and for the circuits shown in FIGURES 14 and 15. All of the switches and contacts are shown in FIGURES 14 and 15 in their normal state at the start of a punch card and with stepping switches **170*a*, 170*b* and 170*c*** in their No. 1 positions.

The operator will at this time commence operation of the key punch machine by manipulating the keyboard 17 thereof. It is assumed that the carriage 44 is in its top-most position shown in FIGURE 6, wherein each row of the light transmititng slits 71 of the light bars **46*a*, 46*b* and 46*c* will be in registry with line No. 1 of its third of a document D which has been placed in proper position for viewing on the panel 42. See FIGURES 1 and 12 for document D. (It will become apparent from the description hereinafter that, although it is assumed arbitrarily that carriage 44 is in its top-most position, such assumption makes no difference, and at the commencement of operation the carriage 44** may be in any position. However, for purposes of an orderly explanation of the operation of the apparatus, it is convenient to make this assumption at the present time.)

It is required that the position on document D identified as column 3, line 10 in the top third of the document, be illuminated first. This requires that carriage 44 move down so that the slits of top bar **46*a* will register with line 10 and it also requires that lamp No. 3 of bar 46*a*** be turned on. It is also required that digit lamp No. 6 be illuminated to indicate to the operator that field No. 1 is a 6-digit field.

It will be evident from an inspection of FIGURE 14 that reverse commutator brush 106 will be in contact with the first few commutator contacts; that prime brush 107 will be in contact with an adjacent commutator contact; and that A.C.–D.C. brush 108 will also be in contact with two of the commutator contacts. However, none of these brushes is yet in contact with commutator contact No. 10, which is wired to contact No. 1 of stepping switch **170*a*. Relays 178 and 179, which are connected to D.C. power lead 180 are, therefore, de-energized. Therefore, the respective contacts or switches 178*a* (and 178*b*) and 179*a* of relays 178 and 179 are in their normal positions as shown in FIGURE 14. Motor 81, which drives carriage 44 and which is a synchronous A.C.–D.C. motor, is powered by A.C. current through a network including power lead 181, branch wires 182, switches 179*a* and 178*a* and wire 183 to that coil (the upper coil as shown in FIGURE 14) of motor 81 which causes the motor to rotate continuously and in a predetermined direction, such being defined herein as the "forward direction" and which operates to move the carriage 44 downwardly (as viewed in FIGURE 6) or forwardly. That is to say, the motor shaft 80 and pulley 82 shown in FIGURE 6 are caused to rotate in counterclockwise direction as viewed in that figure. When A.C.–D.C. brush 108 comes into contact with commutator contact No. 10, a relay circuit is established through the ground connection of contact No. 1 of stepping switch 170*a*, the program wire connecting it to commutator contact No. 10, A.C.–D.C. brush 108, a wire 184 and the coil of relay 178. Energization of relay 178 causes its switches 178*a* and 178*b* to shift from the positions shown in FIGURE 14 to their alternate positions. Referring to the upper left-hand portion of FIGURE 14, two relays 190 and 191 are shown which operate contacts 190*a* and 191*a*, respectively. Relay 191 also operates contact 191*b*, which is a part of the motor network and which is also shown in FIGURE 14. It will be seen that contacts 191*a* and 190*a* will alternately open and close and that relays 190 and 191 will alternately energize and de-energize. Therefore, contact 191*b*, which forms part of the motor network, will oscillate between its two positions. It will further be apparent that under the stated conditions, the motor network, which includes a transformer 192 and full wave rectifiers 193, will supply a pulsing square wave current to the motor 81 and will cause it to step in the forward direction. This has the desirable effect of slowing down the operation of the motor near the end of its forward travel just before prime brush 107 reaches the selected commutator contact, in this case the No. 10 contact. This circuitry has an important advantage in that its permits very rapid travel of carriage 44** in the forward direction, with slow travel (to avoid overtravel and hunting) near the end of the intended travel.

Then prime brush 107 will make contact with commutator contact No. 10. This event establishes a relay circuit through a wire 200 and relay 191. As will be seen, this circuit will also hold relay 178 in energized condition.

Under the stated conditions contact **191*b* will revert to the position shown in FIGURE 14 and switches 178*a* and 178*b*** will hold in their alternate or shifted positions.

It will be apparent that non-pulsing D.C. power is supplied to both coils of motor 81 which locks it instantly and securely in place. This establishes each of the light bars **46*a*, 46*b* and 46*c* in registry with line No. 10 of its third of document D**.

As stated, it is also required, that bar **46*a* be activated, inasmuch as the data for field No. 1 lies in the upper third of the document. This is accomplished as follows: A D.C. power source is provided at 210*a* (see FIGURE 14) which is powered by transformer 192 and is a full wave rectifier. A wire 211 connects with a switch 212*a*, which in turn connects with a switch 214*a*, which in turn connects with a common lead 215*a* to all of the lamps of bar 46*a*. It will, therefore, be apparent that bar 46*a* is activated, and since the three field lamps Nos. 3 are wired to contact No. 1 of stepping switch 170*b* which in turn is connected to the power source through wire 216, it will be seen that field lamp No. 3 of bar 46*a*** will be illuminated, thus illuminating the data of field No. 1.

It is also required that digit lamp No. 6 be illuminated. The circuit for this will be immediately apparent from an inspection of FIGURE 15 and stepping switch **170*c*. As will be seen, these lamps have a common lead connected to a source of D.C. power. Digit lamp No. 6 is wired by a program wire to the No. 1 contact of stepping switch 170*c***, which establishes a ground connection and illuminates digit lamp No. 6.

It is now necessary to move the carriage 44 until light bar **46*b* registers with line 20 of the middle third of document D; it is also necessary to turn on field lamp No. 10 of bar 46*b***; and it is also required to illuminate digit lamp No. 12. This requires a resetting operation, which is accomplished as follows:

As shown in FIGURE 3, a hole is punched in row or line No. 7. This is punched in column No. 6 of the program card in registry with the No. 7 star wheel. This signifies the end of field No. 1. When the end of that field has been reached, the No. 7 star wheel will fall into this end-of-field hole, thereby closing a switch and energizing a relay circuit as follows: Power lead 180, the coil of a relay 220 (see the top portion of FIGURE 15) and wire 221. As a result, the normally open contact 220*a* of relay 220 (such contact appearing in the upper right hand portion of FIGURE 15), will be closed and the circuit of stepping switch 170 will be closed, thereby energizing its coil 171, as follows:

Power lead 180, coil 171, contact 220*a*, wire 222 and the ground connection of switch 223*a*. The energization of coil 171 will, as explained hereinabove and as is well known, cock the mechanical stepping element (which may be a spring) of stepping switch 170. As the operator depresses the next key of the keyboard 17 of the key punch machine, the No. 7 star wheel will leave the end-of-field hole in the program card, thereby de-energizing relay 220 and causing contacts 220*a* to open again. It will, therefore, be apparent that switch 170 is pulsed and by reason thereof it will step one position; in this instance, from the No. 1 position to the No. 2 position, thereby advancing the wiper contacts of its three rotors to their No. 2 positions.

Inasmuch as stepping switch 170*a* is now in its No. 2 position, the mechanism and circuitry whereby carriage 44 is moved forwardly will operate to register light bar 46*b* with line 20 of the middle third of document D. Such operation will be apparent from the previous description and does not require repitition herein. It will also be apparent from the previous description that, in this instance, digit light No. 12 will be energized, inasmuch as it is grounded through contact No. 2 of switch 170*c*.

However, there is further one requirement which is not covered by the previous discussion, and that is the activation of light bar 46*b*, so that field lamp 10 thereof (which is connected to one side of its power supply) will be illuminated. This necessary operation is accomplished as follows:

From the previous discussion and from an inspection of FIGURES 14 and 15, it will be apparent that after stepping switch 170*a* steps to its No. 2 position, a relay 214 is energized through a circuit including power lead 180, the coil of relay 214, program wire 175 and the program wire connecting the No. 2 contact of switch 170*a* with the contact C–20 of the commutator, thence to ground through contact No. 2 of stepping switch 170*a*. This event will shift contact 214*a* of the field lamp switching network from its normal position as shown in FIGURE 15 to its alternate position. The common power lead 215*b* of light bar 46*b* will, therefore, be connected to power through wire 211, switch 212*a*, shifted switch 214*a* and switch 225*a*, thence through the common lead 215*b* and the terminal of field lamp No. 10 to contact No. 2 of stepping switch 170*b* and to power lead 216.

By this means it will be apparent that the data in field No. 2, located in column 10 and line 20 of the middle third of document D, will be illuminated, and that the appropriate digit lamp No. 12, will be illuminated.

At the end of this operation, the No. 7 star wheel will fall into a hole punched in the program card in the manner described hereinabove, which indicates the end of field No. 2, and the machine will be reset as explained above; i.e., stepping switch 170 will step to its No. 3 positions.

It is now required to illuminate field No. 3, which is at column 20 and line 38 in the bottom third of document D. The means whereby carriage 44 is moved downwardly until light bar 46*c* registers with line 38 of the bottom third of the document, will be apparent from the description hereinabove. It is necessary, however, in this instance, to activate light bar 46*c*. This is accomplished as follows:

Relay 214, which appears in the upper left-hand corner of FIGURE 15, is energized through a circuit comprising power lead 180, the coil of relay 214, program wire 176 (see FIGURE 15 and also FIGURE 14), the program wire connecting contact No. 3 of stepping switch 170*a* with commutator contact No. 38, and the ground connection of contact No. 3 of stepping switch of 170*a*. It will be observed that relay 225 is also energized.

This will shift switches 214*a* and 225*a* from their normal positions shown in FIGURE 14, and will thereby apply power to the common power lead 215*c* of light bar 46*c* by way of wire 211 and switches 212*a*, 214*a* and 225*a*. The circuit for field lamp No. 20 of this bar is completed through contact No. 3 of stepping switch 170*b* and wire 216.

It is now necessary to proceed to field No. 4. Inasmuch as this field lies in the bottom third of document D but at line 12, which is above field No. 3, it is now necessary to operate the carriage 44 in reverse until light bar 46*c* registers with line 12 of the bottom third of the document. This reverse operation is accomplished as follows:

The apparatus will be reset in the manner described hereinabove to advance stepping switch 170 to its positions Nos. 4. Preliminarily, it will be seen that contact No. 4 of stepping switch 170*a* is wired to commutator contact No. 12, thereby selecting line 12 of the document; that contact No. 4 of stepping switch 170*b* is wired to the proper point to illuminate a field light in column 12; and that contact No. 4 of stepping switch 170*c* is wired to digit light number 7. Inasmuch as field No. 4 is in the domain scanned by light bar 46*c*, the switching network (which was set in the previous step to activate light bar 46*c*) remains in its previous condition. Therefore, it will be apparent that the circuit is wired appropriately from a programming standpoint, provided the carirage 44 can be made to move upwardly until the light bar 46*c* registers with line 12 in the bottom third of document D. This is accomplished as follows:

Under the stated conditions, it will be apparent that one of the elments of reverse brush 106 is in contact with commutator contact No. 12, which is connected by a programming wire with contact No. 4 of stepping switch 170*a*, which is now grounded. Therefore, a circuit is established through a relay 179 as follows: Power lead 180, the coil of relay 179, wire 210, reverse brush 106, commutator contact No. 12, the program wire connecting that contact with contact No. 4 of stepping switch 170*a*, to ground. Therefore, relay 179 is energized. Being energized, its associated switch 179*a* is shifted from the normal position shown in the motor circuit in FIGURE 14 to the alternate position. Power is supplied to the motor 81 from the A.C. power source through switch 179*a*, switch 178*b* (which is presently in the position shown in FIGURE 14) and to the proper coil of motor 81 (the lower coil is viewed in FIGURE 14) to cause the motor to operate in reverse. Such operation will, of course, cause the carriage 44 to move upwardly, and it will continue to do so until the last element of reverse brush 106 has lost contact with the commutator contact No. 12. During the brief interval of time after the reverse brush 106 loses contact with commutator contact No. 12 and the prime brush 107 establishes contact therewith, relay 179 is de-energized, switch 179*a* resumes its normal position as shown in FIGURE 14, and current is now supplied to the opposite coil of motor 81 which, therefore, acts as a brake to bring the motor quickly to a halt. However, the momentum of the motor is sufficient to carry the prime brush 107 into contact with commutator contact No. 12. At this instant, the motor 81 is instantly locked in position in the manner described hereinabove.

It is apparent that an IBM punch card has been completed by the entry of data in fields Nos. 1, 2, 3 and 4. That being the case, the key punch machine 10 has embodied in it a cam which indicates the end of a card and which automatically resets the key punch machine, ejects the completed card, transfers it to the reading position, brings down another card from the hopper into proper position at the punching station, and performs other operations. It is necessary, of course, to reset the apparatus of the invention by restoring stepping switch 170 to its No. 1 position. This is accomplished as follows:

The apparatus of the present invention includes a wire 230 which is grounded by the program cam of the key punch machine when the later signals the end of a punch card. Such grounding energizes relay 223 through a circuit comprising power lead 180, the coil relay of 223 and wire 230. This relay is held in energized position for a sufficient length of time for the resetting operation to occur, such holding being accomplished by a circuit which includes resistor 231 and switch 227*a*. Switch 227*a*, which appears in the upper right-hand portion of FIGURE 14, is similar to switch 227*b*, which appears in the upper right-hand corner of FIGURE 15. These switches are parts of and are controlled by stepping switch 170. They are in the open position shown in FIGURES 14 and 15, when and only when stepping switch 170 is in its No. 1 position. Inasmuch as the stepping switch 170 is presently off its No. 1 position it will be apparent that the switch 227*a* (also the switch 227*b*) is closed, thereby establishing a holding circuit for relay 223. The energization of relay 223 causes a shifting of switch 223*a* which is shown in the upper righthand portion of FIGURE 15. This establishes a circuit for the coil 171 of stepping switch 170 through power lead 180, the coil 171, switch 232*a*, switch 227*b* (which, as explained above, is now closed because stepping switch 170 is off of its No. 1 position), wire 233, and switch 223*a* to ground.

The switch 232*a* is a part of stepping switch 170, the circuitry of which is such that switch 232*a* repeatedly makes and breaks contact, i.e., it is an interrupter. As explained above, whenever coil 171 is energized by a pulse of current, it cocks the switch in readiness to advance to its next position, and when it is de-energized it advances to the next position. Inasmuch as the switch 232*a* is an interrupter switch which alternately opens and closes, it will be apparent that pulses of current are applied to coil 171 of stepping switch 170 which will, therefore, step through all of its remaining positions back to position No. 1. When switch 170 reaches its No. 1 position, switches 227*a* and 227*b* revert to their normal open positions shown in FIGURES 14 and 15. This means that the holding circuit of relay 223 is opened. Inasmuch as the program cam of the key punch machine has meanwhile passed the end of card position, the circuit previously established by that means is also open. Therefore, relay 223 is and remains de-energized. Therefore, further stepping of switch 170 is terminated, it remains in its No. 1 position and the apparatus of the present invention is reset in readiness for the commencement of a new cycle.

It frequently happens that documents have what is called "header" information and "detailed" or "line" information. Referring now to FIGURE 19 a document D is there shown which is of this type. Thus, at the top or "head" of the document there are data in three fields, for example, invoice number, name of customer and address of customer. Beneath this "header" information are four lines of detailed information, each consisting of three bits of information which are designated for the first line as Field No. 4, Field No. 5 and Field No. 6; for the second line as Fields 4*a*, 5*a* and 6*a*; etc. Note that, in the specific instance shown the header data is in the area scanned by light bar 46*a* and that the detailed lined information appears in the top, middle and bottom thirds of the document scanned by the light bars 46*a*, 46*b* and 46*c*, respectively. Each line of detailed information may, for example, consist of product identification, unit price and number of units. The example chosen is simplified compared to many actual documents of this character which are encountered in practice, but it will serve the purpose of explaining the manner in which the apparatus of the present invention is adapted to handle such documents.

It is desired to enter the data of this document in four different punch cards which will be referred to as the No. 1, No. 2, No. 3 and No. 4 cards. Each of the cards will be punched with the same header data, but card No. 1 will be punched with the data of fields 4, 5 and 6; card No. 2 with the data of fields 4*a*, 5*a* and 6*a*, etc. It will be apparent that each card has something in common with all the cards (the header data) but is different in other respects.

The apparatus of the present invention can be programmed so that, for each of the four cards punched, the header information is scanned and indicated in the same sequence, and then the appropriate light bar (i.e., the light bar 46*a* for fields 4, 5 and 6; light bar 46*b* for fields 4*a*, 5*a* and 6*a*, and also fields 4*b*, 5*b* and 6*b*; and light bar 46*c* for fields 4*c*, 5*c* and 6*c*) is registered with the proper line, is activated and is held stationary during the punching of data while the appropriate field lamps turn on in the required sequence.

This operation will be referred to as "the extended line operation" or "extended line mode," and it is accomplished as follows: To adjust the apparatus for extended line operation, the operator closes the manual switch 240 which is shown in the upper right-hand corner of FIGURE 17 and which is a type of switch which remains in whatever position it has been moved to. In FIGURE 17 this switch is shown closed which indicates that the circuitry of FIGURE 17 (and of companion FIGURE 16) are programmed for extended line operation, whereas the same switch is shown open in FIGURE 15, indicating that the circuitry and programming therein is not intended for extended line operation.

The closing of manual switch 240 by the operator activates a circuit for the coil 241 of the stepping switch 242, such coil being shown in the upper right-hand portion of the FIGURE 17 and the contacts of the stepping switch being shown in the lower right-hand portion of FIGURE 16.

Referring now to FIGURES 16 and 17, it will be seen that contact No. 1 of stepping switch 170*a* is wired to commutator contact No. 10; that contact No. 1 of stepping switch 170*b* is wired to field lamps No. 5; and that contact No. 1 of stepping switch 170*c* is wired to digit lamp No. 4. It will be apparent that the apparatus is, therefore, programmed so that field No. 1 (line 10, column 5 of the upper third of document D) will be illuminated and digit lamp No. 4 will be lit. The wiring of fields Nos. 2 and 3 will be apparent from the description hereinabove and for that reason is omitted from FIGURES 16 and 17. The operation of the apparatus in regard to fields Nos. 1, 2 and 3 will also be apparent and need not be described herein.

Note, however, that contacts Nos. 4, 5 and 6 of stepping switch 170*a* are tied together and are wired to the common lead or terminal of stepping switch 242. This stepping switch is identical to switch 170*a*, except that it has only one rotor and one set of contacts. As stated, its coil 241 is shown in the upper right-hand corner of FIGURE 17.

After the completion of header field No. 3, the carriage 44 will move down to register light bar 46*a* with line 41 of the top third of document D, in the manner described hereinafter. Note, however, that contact No. 4 of stepping switch 170*a*, instead of being wired directly to commutator contact No. 41, is wired via a program wire to the common lead of switch 242, thence through contact No. 1 of stepping switch 242 to commutator contact No.

41. A wire 243 connects the common lead of switch 242 with a relay 212 which, therefore, remains energized all during extended line operation. This results in shifting switch 212*a* of the field lamp switching network to its alternate position (i.e., other than that shown in FIGURE 17). Therefore, light bar 46*a* is activated and its field lamp No. 8 is lit through a circuit comprising power lead 211, switch 212*a*, a switch 251*a*, the common lead 215*a* of light bar 46*a*, field lamp No. 8, contact No. 4 of switch 170*b* and its ground connection or return wire. Digit lamp No. 4 is illuminated by way of its connection with contact No. 4 of stepping switch 170*c*.

When field No. 4 has been punched, the end-of-field signal created by the star wheel No. 7 will cause stepping switch 170 to step to position No. 5. This, by reason of the program wiring of contact No. 5 of switch 170*b* to field lamp No. 11 and by reason of the program wiring of contact No. 5 of switch 170*c* to digit lamp No. 5, will result in lighting field lamp No. 11 in bar 46*a* and digit lamp No. 5. Bar 46*a* will remain stationary and is activated by reason of the circuit described and because contact No. 5 of stepping switch 170*a* is tied to the same program wire as contact No. 4 of stepping switch 170*a*. At the end of field No. 5 an end-of-field signal will step switch 170 to its No. 6 position; field lamp No. 18 of bar 46*a* will be lit; and digit lamp No. 6 will be lit, as will be apparent from the program wiring. It is now necessary to return carriage 44 to its original operating position with light bar 46*a* in registry with line 10 and to repeat the header cycle. This is accomplished by the end-of-card signal above described which resets switch 170 to its No. 1 positions. This resetting operation, as described above, energizes relay 223 which is held energized through a holding circuit as explained above; and it causes switch 170 to reset to its No. 1 position during which time switch 223*a* remains in its alternate position. The shifting of this switch energizes coil 241 of stepping switch 242 which, therefore, cocks this switch in readiness to step to its No. 2 position. The stepping is accomplished when the switch 170 reaches its No. 1 position, switch 227*a* is opened for the reason explained hereinabove, the holding circuit of relay 223 is opened, relay 223 is de-energized and switch 223*a* shifts back to its normal position. At this time the coil 241 of stepping switch 242 is de-energized, thereby causing switch 242 to step to its No. 2 position.

The apparatus is now completely reset to commence the punching of card No. 2 in which the same header information is to be punched followed by punching of information in fields Nos. 4*a*, 5*a* and 6*a* of document D. (On card No. 2 these data will appear in fields identified as Nos. 4, 5 and 6, but to distinguish the fields on document D in FIGURE 19, these series of fields are indicated as 4, 5 and 6; 4*a*, 5*a* and 6*a*; etc.)

The operation of the apparatus to scan header fields Nos. 1, 2 and 3 and to illuminate the proper digit lamps is an exact repetition of header operations in punching card No. 1, and it requires no further description herein. At the end of header field No. 3 it is required to register light bar 46*b* with line 8 of the middle third of document D; to activate that light bar; and to illuminate the digit lamp No. 5. This is accomplished as follows:

When stepping switch 170*a* steps to contact No. 4, a ground connection is established through this contact, the program wire connecting it to the common lead of stepping switch 242, contact No. 2 of that switch and a program wire leading from that contact to commutator contact No. 8. In the manner described hereinabove this will energize motor 81 and move carriage 44 until each of the light bars is in registry with line 8 of its third of document D. A fragment of a program wire 250 is shown connected to contact No. 2 of stepping switch 242 in FIGURE 16 and a fragment of this same wire is shown in the upper left-hand portion of FIGURE 17. This program wire, under the stated conditions, establishes a circuit for a relay 251 through power lead 180, the coil of relay 251, a wire 252, a switch 253*a*, program wire 250, contact No. 2 of stepping switch 242, the common lead of switch 242, the program wire connecting that lead to contact No. 4 of stepping switch 170*a* and the ground connection of that contact. The energization of relay 251 resets the switching network of the field lamps as follows: Switch 212*a* remains in its shifted position for the reason stated above (relay 212, see FIGURE 15, being energized); and switch 251*a* is shifted from its normal position shown in FIGURE 17. It will be seen that, by this means, light bar 46*b* is activated through switches 212*a* and 251*a* (both of which are shifted from the positions shown in FIGURE 17), switch 255*a* (which is in its normal position as shown in FIGURE 17), and the common lead 215*b* of light bar 46*b*. Inasmuch as field lamps No. 8 are connected by a program wire to contact No. 4 of stepping switch 170*b*, it will be apparent that field lamp No. 8 of light bar 46*b* will be lit.

Digit lamp No. 4 it lit by reason of a program wire connecting contact No. 4 of stepping switch 170*c* to digit lamp No. 4.

The carriage 44 will, of course, hold its position in the manner described hereinabove while the punching of fields 5*a* and 6*a* is carried out; field lamps Nos. 11 and 18 of bar 46*b* will light in succession and digit lamps Nos. 5 and 6 will light up, successively; by reason of the program wiring shown in connection with stepping switch 170*c*.

At the end of card No. 2 the machine will reset in the manner described hereinabove, which includes the fact that stepping switch 242 will step to its No. 3 position. Further description with reference to the operation and programming involvced in scanning fields 4*b*, 5*b* and 6*b* is unnecessary except to note that, by a programming which will now be apparent, the carriage 44 is moved to register its light bars with line 25 of their respective thirds of document D.

At the end of card No. 3 it becomes necessary to activate light bar 46*c*, which is accomplished as follows:

When the machine is reset at the end of card No. 3, stepping switch 242 will be on its No. 4 contact, which is wired by a program wire to the No. 3 commutator contact to register the light bars with line No. 3. It is required now to activate light bar 46*c*, which is accomplished as follows: A program wire 256 is added, a fragment of which is shown in FIGURE 16 connected to contact No. 4 of stepping switch 242 and a fragment of which is shown in the upper left-hand portion of FIGURE 17 connected through switch 253*a* to relay 255.

In the previous operation (i.e., the punching of card No. 3) when relay 251 was energized, it not only shifted switch 251*a* of the switching network of the field lamps, but it also shifted switch 251*b*, which is shown in the upper left-hand portion of FIGURE 17. This establishes a holding circuit through a relay 253, switch 251*b*, wire 257 and switch 258*a* to ground. This not only holds relay 251 in energized condition but shifts switch 253*a* when stepping switch 242 steps off its contact No. 2 to contact No. 3.

When stepping switch 242 reaches contact No. 4 it will be seen that relay 255 is energized through power lead 180, the coil of relay 255, switch 253*a*, program wire 256, contact No. 4 of stepping switch 242, the common lead of that switch, the program wire connecting that lead to contact No. 4 of stepping switch 170*a* and the ground connection of that contact.

The energizing of relay 255 will shift switch 255*a* of the switching network of the field lamps. Meanwhile, switch 251*a* is maintained in its shifted position by reason of the holding circuit for relay 251. Therefore, light bar 46*c* is activated through switches 212*a* shifted, 251*a* shifted, 255*a* shifted and the common lead 215*c* of the field lamps of light bar 46*c*.

The end-of-card signal suffices to reset stepping switch 170 to its No. 1 position in the manner described above, but an end-of-card signal normally acts to step switch 242 to its next position. To step switch 242 to its No. 1 position at the end of a document, the operator closes normally open switch 260 which is shown in the upper right-hand portion of FIGURE 16 and which energizes relay 258. This switch is released and it opens again, but relay 258 is held energized via resistor 261 and switch **262*b* and/or via switch 227*a*, which are controlled by stepping switches 170 and 242, respectively, being open when their respective stepping switches are on their No. 1 positions, otherwise being closed. Energization of relay 258 shifts switch 258*a* (upper right-hand portion of FIGURE 17) and closes a circuit through coil 241 of stepping switch 242, its interrupter switch 263, switch 262*a* (which, like switch 262*b* is open when stepping switch 242 is on its No. 1 position, otherwise is closed) and switch 258*a* to ground. Stepping switch 170 is also grounded through switches 232*a*, 227*b* and switch 258*a***. Both stepping switches are stepped back to their No. 1 positions.

If an operator desires to manually step carriage 44, e.g., for adjustment purposes, she will close and then release a normally open switch 265 (upper right of FIGURE 17). This will momentarily energize the coil 241 of stepping switch 242 and will step that switch to its next contact, thereby moving carriage 44 to register with the next line of information.

As explained hereinabove, the end of a field is signalled by the No. 7 star wheel. This pulses relay 220, which momentarily closes switch **220*a* and causes stepping switch 170** to step.

It may happen that there are two adjacent end-of-field signals. This occurs where there is one field followed by another field consisting of a single column of a punch card. If the No. 7 position in the preceding field is punched to indicate the end of that field and the single column field is also punched in the No. 7 position to indicate the end of the next field, difficulties will occur because the star wheel would hold relay 220 energized through two successive holes in a program card, and the end of the preceding field would be skipped. To avoid this the following auxiliary circuitry is provided.

A No. 6 star wheel is provided (see FIGURE 3) and a hole is punched in the No. 6 position of the program card to indicate the end of a single column field. When the No. 6 star wheel falls into this hole, it establishes a circuit as follows: Referring to FIGURES 14 and 15, power lead 180, a relay 275 and a wire 276 to the ground connection created by the No. 6 star wheel. This energizes relay 275 which is held energized by way of a resistor 277, a switch **278*a*, a wire 279, switch 223*a* and its ground connection. This has the result of closing switch 275*a* which is in series with a relay 278, interrupter switch 232*b* of stepping switch 170 and switch 220*b*. When the No. 7 star wheel completed its operation in the preceding field to indicate the end of that field, relay 220 was de-energized and switch 220*b* was, therefore, returned to closed position. After the preceding operation of stepping switch 170, its interrupter switch 232*b* closed. Therefore, relay 278 is energized through a circuit comprising power lead 180, the coil of relay 278, switches 232*b* and 275*a*, switch 220*b*, wire 279, switch 223*a* and its ground connection. This closes switch 278*b* and energizes coil 171 of stepping switch 170. But as star wheel No. 6 moves out of the No. 6 hole in the program card, stepping switch 170 is de-energized. This pulsing operation, as explained hereinabove, cocks the switch 170** and then steps it to its next position. Thereby an auxiliary circuit is provided for this eventuality.

Referring now to FIGURES 4, 9, 10 and 13 the manner in which the apparatus 40 is programmed, and is designed for quick change of programming will be described. Referring to the circuit drawings of FIGURES 14 and 15, the stepping switches **170*a*, 170*b* and 170*c* and the stepping switch 242, also the commutator, the field lamps and the digit lamps, have terminals as shown. Each of these terminals is wired to a female connector on one or the other of the connector members at 121 in FIGURE 10. For convenience, all such wires from the switch 170*a* will be wired to a single such connector member; the wires from the commutator will be wired to a single such connector member, etc. Each wire uniquely connects to a male pin in the companion male connector member 122. Further, each of the male pins is connected to a connector pin 152 of the program panel 145. These pins are arranged in pairs and, as explained hereinabove, they are lodged in a board of suitable insulating material. For convenience, the wiring from the various circuit elements through the male-female connector pairs 121, 122 to the pins of panel 145** is as follows:

Area A—Field lamps (22 in all).
Area B—Extended line operation.
Area C—Light bars **46*a*, 46*b* and 46*c***, respectively.
Area D—Digit lamps.
Area E—Commutator contacts.
Area F—Contacts of stepping switch **170*a***.
Area G—Contacts of stepping switch 242.
Area H—Contacts of stepping switch **170*b***.
Area I—Contacts of stepping switch **170*c***.

As yet no program circuits are closed. They are closed by crosswiring between selected pins 152. The following examples will suffice to illustrate how this is done.

Referring to FIGURE 13 and to also FIGURES 14 and 15, the circuit is programmed to light field lamp No. 3 in line 10 in light bar **46*a* and to light digit lamp No. 6. Note that the No. 1 pair of pins of area F (stepping switch 170*a*) are wired to the No. 10 pins of area E (commutator contacts), which constitutes the program wire of FIGURE 14 which selects commutator contact No. 10. Note also that the No. 1 pins of area H (stepping switch 170*b*) are wired to pins No. 3 of area A (field lamps), which constitutes the program wire between switch 170*b* and field lamps No. 3. Note also that the No. 1 pins of area I (stepping switch 170*c*) are wired to the No. 6 pins of area D, which constitutes the program wire to connect contact No. 1 of stepping switch 170*c* with digit lamp No. 6. Note also that a wire is connected between the No. 1 pins in area F and the No. 1 pins in area C, which constitutes a program wire to activate light bar 46*a***.

Further programming of the data appearing on document D of FIGURE 18 will be apparent from the aforegoing description and from an inspection of FIGURE 13.

Referring now to FIGURE 13A, a partial wiring is shown for the extended line operation required for document D of FIGURE 19, such wiring being also shown in FIGURES 16 and 17.

Document D of FIGURE 19 has a first header field (field No. 1) which is in the domain of light bar **46*a* at column 5, line 10 and it is a four digit field. The program wiring for this set of facts will be evident. Note also that a program wire connects pins Nos. 1 of area B to pins Nos. 1 of area F, so that the light bar 46*a*** is activated, and at the end of each card it is reactivated. Note also that pins No. 1 of area *b* (corresponding to stepping switch 242) is wired to pins 41 of area E to correspond to the fact that the first extended line is at line 41. Note also that pins Nos. 4, 5 and 6 of area F are wired together and to the common head pins of area G, which establishes the wiring shown to the common lead of switch 242 in FIGURE 16. Note also that, for the second extended line (fields 4*a*, 5*a* and 6*a*), pins No. 2 of area G are wired to pins No. 8 of area E (corresponding to the fact that these fields are at line 8) and also to contacts Nos. 2 of area B (corresponding to the fact that these fields are in the domain of light bar **46*b***). Further wiring for document D of FIGURE 19 will be apparent.

It will be apparent that, by this means a stock of removable program assemblies 117 can be kept, each for a given type of document and/or operation, and when an operator shifts from one type of document or operation to another it is only necessary to lift the handle 124, remove the removable assembly, insert a new assembly, and close the handle to clamp it securely in place.

Referring now to FIGURE 20 the document D of FIGURE 18 is there shown overlaid by a transparent grid 350. This grid is divided into three areas corresponding to the upper, middle and lower thirds of the area scanned by light bars 46*a*, 46*b* and 46*c*, respectively. Each of these areas is divided into forty-four smaller areas by numbered horizontal lines and the grid is further divided into twenty-two vertical columns. It will be seen that, by laying the grid 350 over the document D, the location of each item of data thereon can be determined. That is to say, the third of the document to which it belongs, the line within this third and the column are determined, thereby precisely defining the location for programming and wiring purposes. It has already been explained that, by assigning three co-ordinates to each item of data (i.e., the third of the grid in which it is located, the horizontal line at which it is located and the vertical column at which it is located), the appropriate program wiring can be carried out.

It will be noted, with reference to the wiring diagrams of FIGURES 14 to 17, that diodes are used at various points in the circuit. The purpose of these is to prevent flow of current in the wrong direction. There will also be seen various resistors and condensers whose functions will be apparent and whose values can be easily selected by one skilled in the art.

Various fuses are also shown at appropriate points in the circuit. In FIGURE 15 several lamps are shown below the digit lamps, which also appear in FIGURE 12. These represent special function lamps which may be program wired to indicate special functions or situations, as desired. The switch, frame connection and ground connection shown in the upper left of FIGURE 14 represent the No. 7 (or No. 6) star wheel switch, various frame connections and various ground connections discussed hereinabove. The loop shown in the same area of FIGURE 14 signifies that the wires embraced thereby are incorporated in a cable which connects with the key punch machine.

It will, therefore, be seen that the data scanning and indicating apparatus of the invention scans a document on which data is recorded, such data being distributed among a multiplicity of data fields. The location of each data field is defined by a pair of rectangular co-ordinates which locates the field by an *x* co-ordinate (the distance from one margin of the document) and a *y* co-ordinate (the distance from an adjacent margin of the document). The "third co-ordinate" mentioned above has reference to the third of a document on which a data field is located. It will be apparent that other co-ordinate systems than rectangular co-ordinates may be used, although the latter are more advantageous because documents themselves are ordinarily in rectangular form and lend themselves to the use of a rectangular system of co-ordinates. The apparatus has a scanning instrumentality which includes illuminating means and is capable of movement relative to the document, to register the illuminating means with one of the aforesaid co-ordinates. The scanning instrumentality also has means for shifting its focus to register with the other co-ordinate. In a preferred embodiment of the invention, a movable carriage is provided which has an illuminating instrumentality in the form of a light bar which in turn consists of a plurality of individual lamps. Movement of the carriage brings about registration of the illuminating instrumentality with one of the aforesaid co-ordinates (or one row of fields). Selective energization of one of the lamps is brought about to register the illuminating means with the other co-ordinate, thereby spotting an individual field. Preferably this light carriage has more than one such instrumentality or light bar so that it is not necessary to move the carriage the entire length of a document. And in this case, the control system senses not only the co-ordinates of the desired data field, but also the portion of the document in which it is located, e.g., the top third, the middle third and the lower third.

It will, therefore, be apparent that an apparatus has been provided which efficiently and quickly scans a document to aid in the selection of data therefrom, as for transposing to a punch card through the medium of a key punch machine.

We claim:

1. Apparatus for scanning a document and visually indicating the location of data on such document distributed among a plurality of field locations on the document, each field location having a first co-ordinate corresponding to the distance of such field from one edge of the document and a second co-ordinate corresponding to the distance of such field from an adjacent edge of the document, said apparatus comprising:

a viewing station for supporting a document conveniently for viewing by an operator while operating a data recording machine and for holding such document in a predetermined position in relation to a co-ordinate system;

a movable lighting assembly movable relatively to said co-ordinate system to illuminate any field location of said document; and control means for so moving said lighting assembly to illuminate a plurality of field locations in a predetermined sequence.

2. Apparatus for scanning a document having data fields thereon each of which is uniquely defined, as regards its location, by the *x* and *y* co-ordinates of a rectangular co-ordinate system, said apparatus comprising:

a viewing station provided with the means to hold such document in a predetermined relation to said co-ordinate system, a lamp assembly comprising at least one bank of a plurality of lamps movable in parallelism to one of the axes of said co-ordinate system whereby upon movement of said bank and energization of a selected lamp thereof, any of many fields having different *x* and *y* co-ordinates can be illuminated and, means for moving said bank and energizing said lamps to illuminate a multiplicity of data fields on said document in a predetermined sequence.

3. The apparatus as defined in claim 2 wherein said means for moving said bank and energizing said lamps includes means for changing the predetermined sequence in which said bank is moved and lamps are energized.

4. The apparatus of claim 2 wherein said lamp assembly comprises a plurality of such banks, each arranged to scan a portion of said document, and said moving and energizing means is adapted to sense the portion of the document on which each data field is located and to register the corresponding bank therewith.

5. Apparatus for illuminating any of a multiplicity of fields on a data-bearing document, each such field being defined by the *x* and *y* co-ordinates of a rectangular co-ordinate system, said apparatus comprising:

a light bar movable in parallelism to the *y* axis of such co-ordinate system and having means for energizing any of a plurality of segments of such bar, each energized segment being capable of illuminating a small area on the document whereby, upon movement of the bar and energization of individual segments thereof any of the large number of fields on said document can be individually illuminated, a motor for moving said bar in either direction, a motor control adapted, in response to a programmed signal, to sense the location of the *y* co-ordinate of a field and to operate the motor to move said bar into registry with such *y* co-ordinate and, a segment control adapted, in response to a programmed signal, to energize the light bar segment corresponding to the $x$ co-ordinate of such field, said motor and segment control being operable, in response to a succession of signals, to operate said light bar to illuminate a plurality of data fields in a predetermined sequence.

6. In apparatus for scanning a document having a first side and a second adjacent side and having data distributed thereon at different points each located in registry with a reference line parallel to said first side, there being a large number of such reference lines parallel to one another and to said first side, the combination of:

a light bar parallel to said reference lines and movable perpendicularly thereto to register with any of such reference lines, a motor for so moving said bar in either direction, a contact member for each reference line, a motor circuit associated with said contacts whereby, when the motor circuit is activated, the motor will operate to move said bar toward any selected reference line and will stop movement of the bar in registry with such line and, a program device having a plurality of circuit elements each connectable to one of said contacts to so register the light bar with the reference line corresponding to such contact, said program device being of a stepping type whereby said bar can be registered with a multiplicity of reference lines in a predetermined sequence.

7. In apparatus for scanning a document having a first side and a second adjacent side and having items of data distributed thereon at various positions between said first side and the opposite side, the combination of:

a light bar comprising a plurality of individual lamps arranged side by side to extend across such document from said first side to the opposite side, said bar being movable in parallelism to said first side to scan such document, said lamps being individually energizable whereby, upon movement of said bar and selective energization of said lamps, a substantial portion of such document can be scanned and a multiplicity of small areas within the scanned portion can be individually illuminated;

a normally open circuit for each lamp which is operable, when closed, to energize its respective lamp and, programmed stepping means having, for each of a multiplicity of steps, circuit closing means for a particular one of said lamps whereby a plurality of said lamps can be energized in a predetermined sequence.

8. Apparatus for scanning a document having data fields thereon, the location of each field being uniquely defined by the $x$ and $y$ coordinates of a rectangular coordinate system, said apparatus comprising:

a viewing station provided with means to hold such document in a predetermined relation to said coordinate system, a lamp assembly comprising a plurality of parallel banks of lamps extending parallel to one of the axes of said coordinate system, means movably mounting the lamp assembly for movement a distance substantially equal to the spacing between adjacent banks of lamps, the banks of lamps being movable along separate portions of and in parallelism to the other of the axes of said coordinate system, and means for moving said lamp assembly and energizing said lamps to illuminate a multiplicity of data fields on said document in a predetermined sequence.

9. The apparatus as defined in claim 8 wherein said means for moving said lamp assembly and energizing said lamps includes a plurality of program means each adapted to move said lamp assembly and energize said lamps in a different predetermined sequence, and means for changing from one to another of said program means.

10. The apparatus as defined in claim 8 which includes at least three banks of lamps which are substantially equally spaced apart.

11. The apparatus as defined in claim 10 wherein said means for energizing said lamps comprises means for energizing lamps in only one bank of lamps at any one time.

12. In combination:

a key punch machine having a keyboard and rotary program drum with a program card attached thereto and adapted to be operated by means of said keyboard to transpose data from a source document to a secondary document, said program drum and attached program card rotating during operation of the keyboard, a viewing station adapted to hold a source document in a predetermined, fixed position, means for illuminating any of a large number of small, predetermined areas on said source document when held at said station in said position.

circuit means for actuating said illuminating means to illuminate any of said areas, a movable program device for controlling said circuit means to operate said illuminating means in predetermined sequence, and sensing means operated in conjunction with the program card on the program drum, for controlling movement of said movable program device.

13. The combination as recited in claim 12 wherein said movable program device is operated in steps.

14. Apparatus for illuminating any of a multiplicity of fields on a data-bearing document comprising, a light assembly comprising a plurality of parallel light bars, each of said light bars comprising a plurality of lamps each having a pair of terminals, means for movably mounting said light assembly, a power source with a pair of terminals for energization of selected lamps, a plurality of common power leads interconnecting one terminal of the lamps in each light bar, a different one of said power leads being associated with lamps in a different one of said light bars, means for selectively connecting any one common power lead to one terminal of the power source, means for interconnecting the other lamp terminals of one lamp in each light bar, and means for selectively connecting any one or more of said interconnected other lamp terminals to the other terminal of the power source for energization of any one or more lamps in any one light bar.

15. Scanning apparatus for scanning a rectangular document which is held in a predetermined scanning position in which the document is divided by a grid consisting of a first set of reference lines parallel to one side of the document and a second set of reference lines parallel to an adjacent side of the document, said grid serving to divide the document into a multiplicity of rows each consisting of a multiplicity of fields formed by the intersections of said reference lines, said apparatus serving to illuminate individual fields of the document in a predetermined sequence, said apparatus comprising:

a light bar movable relatively to said document in parallelism to one set of reference lines, said light bar having a multiplicity of individual lamp means, each adapted to illuminate a single field, said bar and its lamp means being arranged so that, upon movement of the bar, each field of at least a portion of the document is scanned by said lamp means, a motor, means connecting the motor to said light bar, a normally open motor energization circuit, a contact element for each row of fields, a brush relatively movable along said contact elements upon movement of said light bar by said motor, a stepping device and program means, means for interconnecting said contact elements and associated brush, motor energization circuit, program means and stepping device for energization of said motor and movement of the light bar in a predetermined sequence to register with a multiplicity of field rows, a normally open lamp means energization circuit, and means for interconnecting said lamp means energization circuit and program means and stepping device for energization of the lamp means in a predetermined sequence in synchronism with the movement of the light bar.

References Cited by the Examiner

UNITED STATES PATENTS

| | | | |
|---|---|---|---|
| 2,600,144 | 6/1952 | Watson | 235—92 |
| 2,917,733 | 12/1959 | Justus | 340—344 |

MAYNARD R. WILBUR, *Primary Examiner.*

J. F. MILLER, *Assistant Examiner.*